(12) United States Patent
Yoda

(10) Patent No.: US 11,441,927 B2
(45) Date of Patent: Sep. 13, 2022

(54) SENSOR UNIT, CONSTRUCTION MACHINE, AND STRUCTURE MONITORING DEVICE

(71) Applicant: Seiko Epson Corporation, Tokyo (JP)

(72) Inventor: Kentaro Yoda, Chino (JP)

(73) Assignee: Seiko Epson Corporation

( * ) Notice: Subject to any disclaimer, the term of this patent is extended or adjusted under 35 U.S.C. 154(b) by 498 days.

(21) Appl. No.: 16/412,552

(22) Filed: May 15, 2019

(65) Prior Publication Data

US 2019/0353506 A1 Nov. 21, 2019

(30) Foreign Application Priority Data

May 16, 2018 (JP) .............................. JP2018-094439

(51) Int. Cl.
| | |
|---|---|
| *G01D 11/24* | (2006.01) |
| *G01C 19/5783* | (2012.01) |
| *G01P 1/02* | (2006.01) |
| *G01B 21/22* | (2006.01) |
| *E02F 3/36* | (2006.01) |
| *G01P 15/08* | (2006.01) |
| *G01P 15/12* | (2006.01) |
| *G01P 15/18* | (2013.01) |

(52) U.S. Cl.
CPC .............. *G01D 11/245* (2013.01); *E02F 3/36* (2013.01); *G01B 21/22* (2013.01); *G01C 19/5783* (2013.01); *G01P 1/023* (2013.01); *G01P 1/026* (2013.01); *G01P 15/0802* (2013.01); *G01P 15/123* (2013.01); *G01P 15/18* (2013.01)

(58) Field of Classification Search
CPC ..... G01P 1/023; G01P 1/026; G01C 19/5783; G01D 11/245
See application file for complete search history.

(56) References Cited

U.S. PATENT DOCUMENTS

| | | | | |
|---|---|---|---|---|
| 3,897,979 | A * | 8/1975 | Vangalis | B60T 13/74 303/24.1 |
| 6,362,971 | B1 * | 3/2002 | Skofljanec | B60R 21/01 361/752 |
| 2003/0154787 | A1 * | 8/2003 | Yoshiuchi | G01P 1/023 73/493 |
| 2013/0176714 | A1 * | 7/2013 | Leegate | F21V 23/0414 362/184 |

FOREIGN PATENT DOCUMENTS

JP 2017-110998 A 6/2017

OTHER PUBLICATIONS

Adafruit.com product webpage for "Small Plastic Project Enclosure—Weatherproof with Clear Top" as retrieved from Wayback Machine Internet archive Jun. 4, 2016, https://web.archive.org/web/20160604072420/https://www.adafruit.com/product/903. (Year: 2016).*

* cited by examiner

*Primary Examiner* — Paul M. West
(74) *Attorney, Agent, or Firm* — Harness, Dickey & Pierce, P.L.C.

(57) ABSTRACT

A sensor unit includes a first sidewall, a second sidewall, a third sidewall connected to one end of the first sidewall and one end of the second sidewall, and a fourth sidewall opposed to the third sidewall of a container including a lid, a first connector, and a second connector. The first connector is attached to the first sidewall further on the side of the fourth sidewall than the side of the third sidewall. The second connector is attached to the second sidewall further on the side of the third sidewall than the side of the fourth sidewall.

14 Claims, 13 Drawing Sheets

SENSOR UNIT, CONSTRUCTION MACHINE, AND STRUCTURE MONITORING DEVICE

The present application is based on and claims priority from JP Application Serial Number 2018-094439, filed May 16, 2018, the disclosure of which is hereby incorporated by reference herein in its entirety.

BACKGROUND

1. Technical Field

The present disclosure relates to a sensor unit, a construction machine, and a structure monitoring device.

2. Related Art

JP-A-2017-110998 (Patent Literature 1) describes a construction machine (a hydraulic shovel) including a work mechanism detecting device that can highly accurately measure positions and postures of members configuring a work mechanism using sensor units including inertial sensors such as acceleration sensors and an angular velocity sensor. In the sensor unit used in the construction machine, one acceleration sensor is disposed to detect acceleration in an X-axis direction, the other acceleration sensor is disposed to detect acceleration in a Z-axis direction, and the angular velocity sensor is disposed to detect angular velocity around a Y axis. The sensor units are set in three places of an arm of the hydraulic shovel and an upper pivoting body configuring a vehicle body.

However, a connector is provided in only one place in the sensor units described in Patent Literature 1. Therefore, it is substantially difficult to make it compact to draw around a cable that connects, in series, the sensor units set in the respective places in an extremely limited region of the arm section of the hydraulic shovel.

SUMMARY

A sensor unit according to an aspect of this application includes: a container including a base and a lid attached to the base to configure a housing space on an inside; an inertial sensor housed in the housing space; and a first connector and a second connector attached to the container. The container includes: a first sidewall and a second sidewall opposed to each other; a third sidewall connected to one end of the first sidewall and one end of the second sidewall; and a fourth sidewall connected to another end of the first sidewall and another end of the second sidewall and opposed to the third sidewall. The first connector is attached to the first sidewall and disposed further on a side of the fourth sidewall than a side of the third sidewall. The second connector is attached to the second sidewall and disposed further on the side of the third sidewall than the side of the fourth sidewall.

In the sensor unit described above, in the base, fixed regions attached to a mounting target section may be respectively provided on sides of opposed two sidewalls of the container in a plan view, a first through-hole may be provided in the fixed region on the side of one sidewall of the two sidewalls, and a second through-hole may be provided in the fixed region on the side of another sidewall of the two sidewalls.

In the sensor unit described above, the one sidewall may be the first sidewall, the other sidewall may be the second sidewall, the first connector may not overlap the first through-hole in the plan view, and the second connector may not overlap the second through-hole in the plan view.

In the sensor unit described above, the container may have a rectangular shape in the plan view, and the first sidewall and the second sidewall may be sidewalls on a side of a short side of the container.

In the sensor unit described above, the fixed regions may be disposed on both sides in a long side direction of the container.

In the sensor unit described above, in the lid, a first region of a first corner portion on the first through-hole side may be attached to the base on the side of the first sidewall of the container in the plan view and a second region of a second corner portion on the second through-hole side may be attached to the base on the side of the second sidewall of the container in the plan view.

In the sensor unit described above, in the lid, a fifth region disposed further on the side of the second region than a side of a third region of a third corner portion on an opposite side of the first corner portion of the first sidewall of the container in the plan view and a sixth region disposed further on the side of the first region than a side of a fourth region of a fourth corner portion on an opposite side of the second corner portion of the second sidewall of the container in the plan view may be attached to the base.

In the sensor unit described above, the base may include: a first protrusion provided in the fifth region; and a second protrusion provided in the sixth region.

In the sensor unit described above, the base and the lid may be attached by a screw or a joining member.

In the sensor unit described above, the lid and the base may be attached via a circumferential seal member.

In the sensor unit described above, a recessed section may be provided on a first surface on a side of the base to which the lid is attached, and the inertial sensor may be attached along at least any one of sidewalls on an inner side of the recessed section.

In the sensor unit described above, the first connector may be attached to the first sidewall via a first seal ring, and the second connector may be attached to the second sidewall via a second seal ring.

In the sensor unit described above, in each of the fixed regions, a hole section for positioning may be provided in a position not overlapping the first through-hole or the second through-hole in the plan view, and the hole section may be a recessed section provided on a side of a second surface in a front-back relation with a first surface on a side of the base to which the lid is attached or a through-hole piercing through the base from the first surface to the second surface.

In the sensor unit described above, the lid may have a recessed shape, and the base may be attached to the lid to close an opening of a recess of the lid.

In the sensor unit described above, the base may include a recessed section, and the lid may be attached to the base to close an opening of the recessed section.

A construction machine according to an aspect of this application includes: the sensor unit described in any one of the preceding paragraphs; a work mechanism configured by a turnable plurality of members to which the sensor unit is attached; an operation device for operating the members configuring the work mechanism; and a vehicle body in which the work mechanism is provided. The sensor unit detects at least one of angular velocity and acceleration acting on the members and calculates, based on at least one of the detected angular velocity and the detected acceleration, posture angles of the members.

A structure monitoring device according to an aspect of this application includes: the sensor unit described in any one of the preceding paragraphs; a receiving section configured to receive a detection signal from the sensor unit attached to a structure; and a calculating section configured to calculate, based on a signal output from the receiving section, an inclination angle of the structure.

DESCRIPTION OF EXEMPLARY EMBODIMENTS

An embodiment is explained below. The embodiment explained below does not unduly limit the content of the present disclosure described in the appended claims. Not all of components explained in the embodiment are essential constituent elements of the present disclosure.

In some of the drawings referred to below, an X axis, a Y axis, and a Z axis are illustrated as three axes orthogonal to one another. In these drawings, a direction parallel to (along) the X axis is referred to as "X-axis direction" as well, a direction parallel to (along) the Y axis is referred to as "Y-axis direction" as well, and a direction parallel to (along) the Z axis is referred to as "Z-axis direction" as well. A distal end side of arrows of the axes is referred to as "plus side" as well and the opposite side of the distal end side is referred to as "minus side" as well. The minus side in the Z-axis direction is referred to as "upper" as well and the plus side in the Z-axis direction is referred to as "lower" as well.

Sensor Unit

Overview of a Sensor Unit

Figure 1:
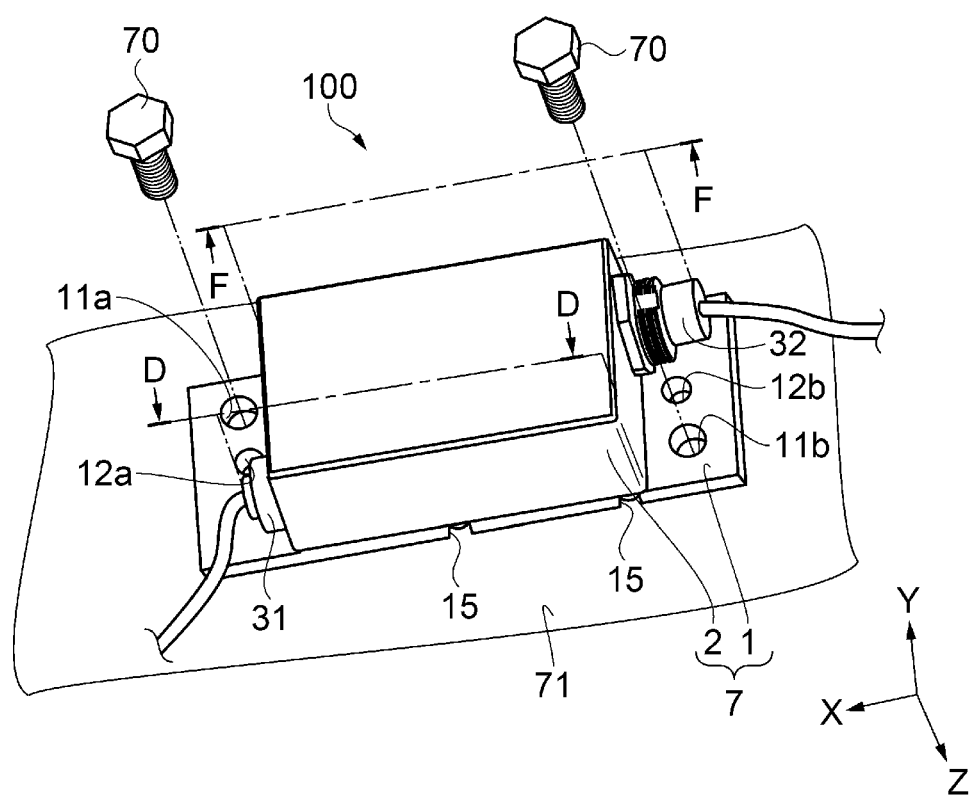
FIG. 1 is a perspective view showing a state in which a sensor unit is fixed to a mounting target surface.
Figure 2:
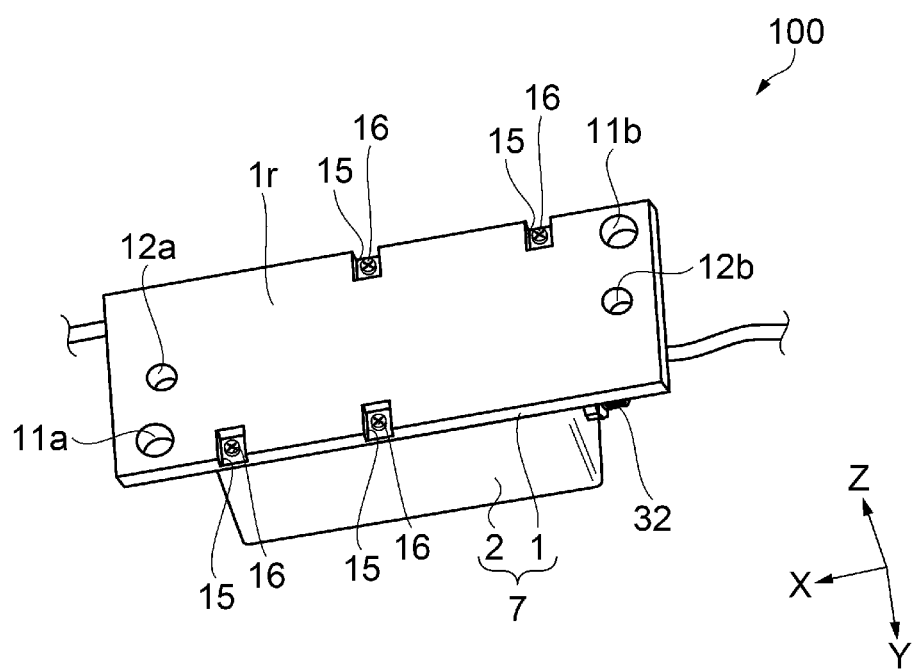
FIG. 2 is a perspective view showing an overview of the sensor unit viewed from the mounting target surface side shown in FIG. 1.

First, an overview of a sensor unit is explained with reference to FIGS. 1 and 2. FIG. 1 is a perspective view showing a state in which a sensor unit according to an embodiment is fixed to a mounting target surface. FIG. 2 is a perspective view showing the overview of the sensor unit viewed from the mounting target surface side in FIG. 1.

A sensor unit 100 shown in FIG. 1 is an inertial measurement device that detects a posture and a behavior (an inertial motion amount) of a mobile body (a mounting target apparatus) such as an automobile, an agriculture machine, a construction machine, a robot, or a drone. The sensor unit 100 can be caused to function as a so-called six-axis motion sensor including, as inertial sensors, an angular velocity sensor that detects angular velocities of three axes and a three-axis acceleration sensor or can be caused to function as a so-called three-axis motion sensor including an acceleration sensor that detects accelerations of three axes.

The sensor unit 100 is a rectangular parallelepiped, a plane shape of which is a rectangular shape (in this example, a rectangle). As the size of the sensor unit 100, the length of a long side along the X-axis direction is approximately 100 mm, the length of a short side along the Y-axis direction orthogonal to the X-axis direction is approximately 40 mm, and the thickness (in the Z-axis direction) is approximately 30 mm. The sensor unit 100 includes a container 7 including a base 1 and a lid 2 having a recessed shape (a box shape) attached to the center in a long side direction (the X-axis direction), which is a direction along a long side of the base 1. In the container 7 in this embodiment, a housing space is configured by attaching the lid 2 to the base 1 to close an opening of the recessed shape (the box shape). The sensor unit 100 includes, at end portions (fixed regions) on both sides in the long side direction (the X-axis direction) of the base 1, a first through-hole 11a and a second through-hole 11b, which are two screw holes, respectively provided substantially diagonally closer to sides of long sides. That is, the first through-hole 11a and the second through-hole 11b are provided in positions deviating to the sides of the long sides rather than the center in a short side direction of the base 1. In the sensor unit 100, fixing screws 70 are respectively inserted through and screwed in the first through-hole 11a and the second through-hole 11b, whereby a rear surface 1r (a second surface) of the base 1 facing the plus side in the Z-axis direction is fixed to a mounting target surface 71 of a structure (an apparatus) such as a bridge or a bulletin board. The sensor unit 100 is used in this state. The lid 2 is fixed to the base 1 via a circumferential seal member 6 (see FIG. 3) by screws 16 inserted through second screw holes for fixing 18 (see FIG. 5) including recessed sections (dredged section) 15 provided in four places. Positioning holes 12a and 12b are provided on the respective center sides in the Y-axis direction of the first through-hole 11a and the second through-hole 11b.

In the sensor unit 100, the lid 2 is attached to the center on the front surface side facing the minus side in the Z-axis direction on the opposite side of the rear surface 1r of the base 1. A first connector 31 and a second connector 32 are respectively attached to two sidewalls opposed to each other along a short side (the Y-axis direction) crossing a long side (the X-axis direction) of the lid 2 via a first seal ring 66a and a second seal ring 66b (see FIGS. 9A and 9B). The first connector 31 and the second connector 32 have a function of performing electric connection to the inside and the outside of the container 7. Since the sensor unit 100 includes the first connector 31 and the second connector 32 as two connectors in this way, it is possible to connect a plurality of sensor units 100 in series and use the plurality of sensor units 100.

The size related to the sensor unit 100 is an example. It is also possible to reduce the sensor unit 100 to a size mountable on, for example, an HMD (head mounted display or a smart glass), a smartphone, and a digital camera through selection of components and a design change.

In the following explanation, a direction along the long side of the sensor unit 100 formed in the rectangle in a plan view from the lid 2 side along the Z-axis direction is represented as a first direction (the X-axis direction). A direction orthogonal to the first direction (the X-axis direction) (a direction along the short side of the sensor unit 100) in the plan view is represented as a second direction (the Y-axis direction). The thickness direction of the sensor unit 100 is represented as a third direction (the Z-axis direction).

The sensor unit 100 includes the two connectors (the first connector 31 and the second connector 32) connectable in series. A characteristic package configuration for reducing a width dimension, which is a dimension in the second direction (the Y-axis direction), is adopted in the sensor unit 100. In the following explanation, this characteristic container 7 (the package configuration including the external shape) is explained in detail. This configuration is not limited to the three-axis or six-axis motion sensor and can be applied to a unit or a device including a physical quantity sensor (an inertial sensor 3).

Configuration of the Sensor Unit

Figure 3:
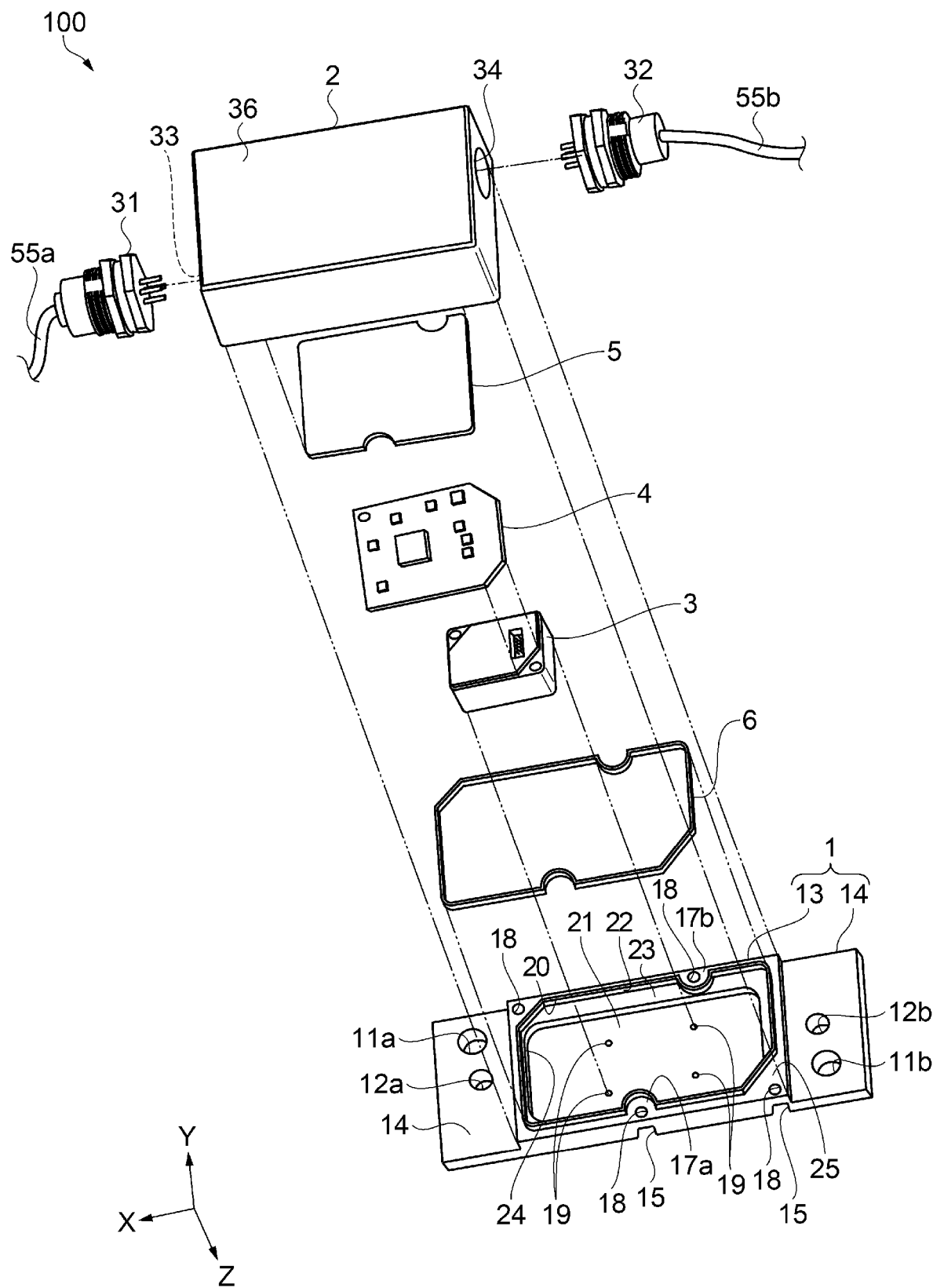
FIG. 3 is an exploded perspective view of the sensor unit in the same state as the state in FIG. 1.
Figure 4A:
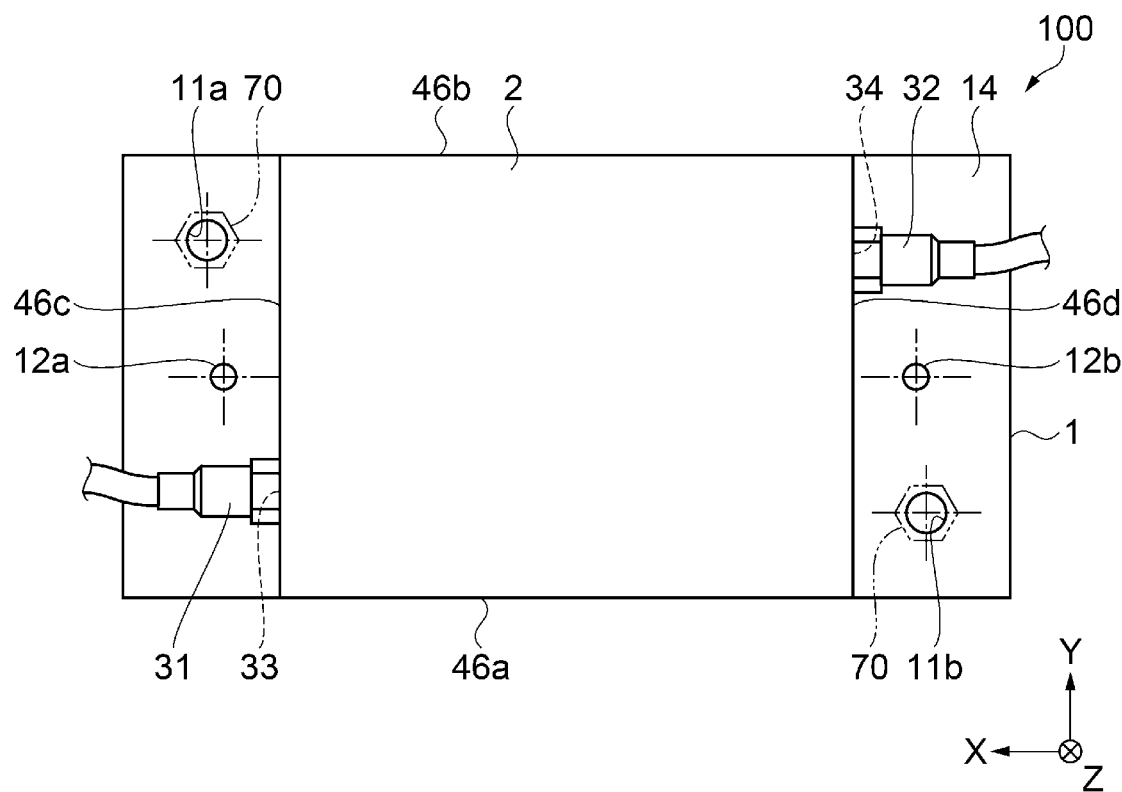
FIG. 4A is a plan view of the sensor unit.
Figure 4B:
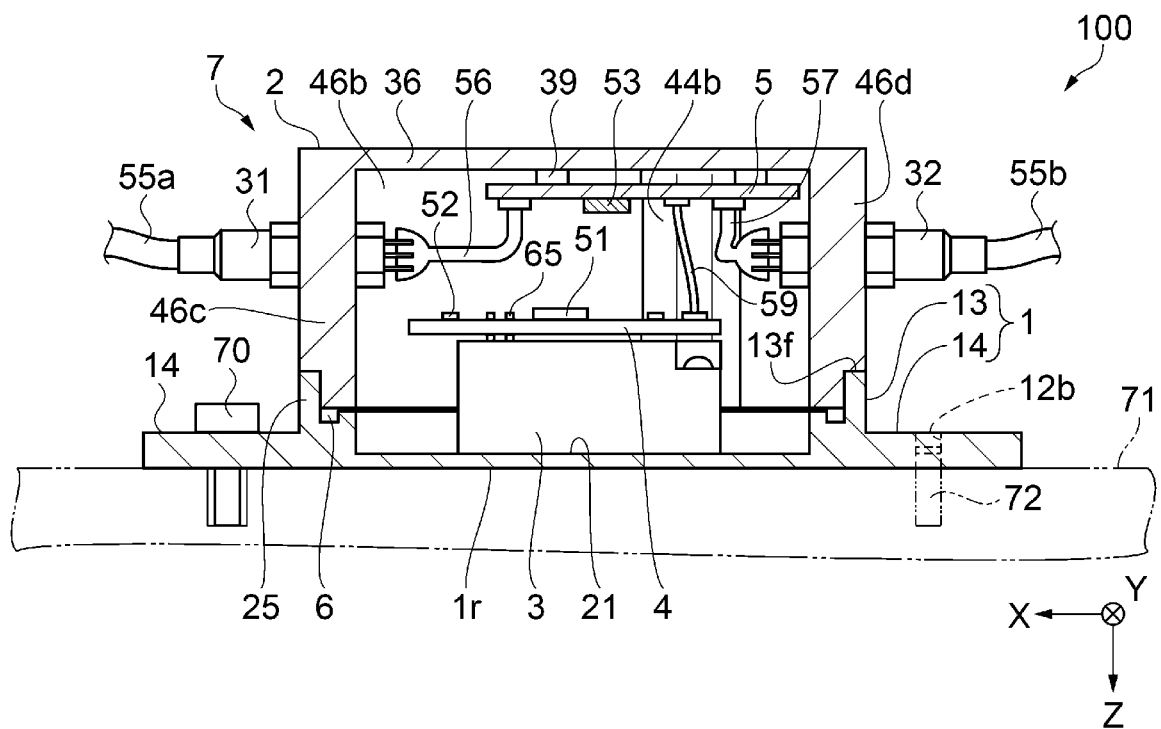
FIG. 4B is a sectional view of the sensor unit.
Figure 5:
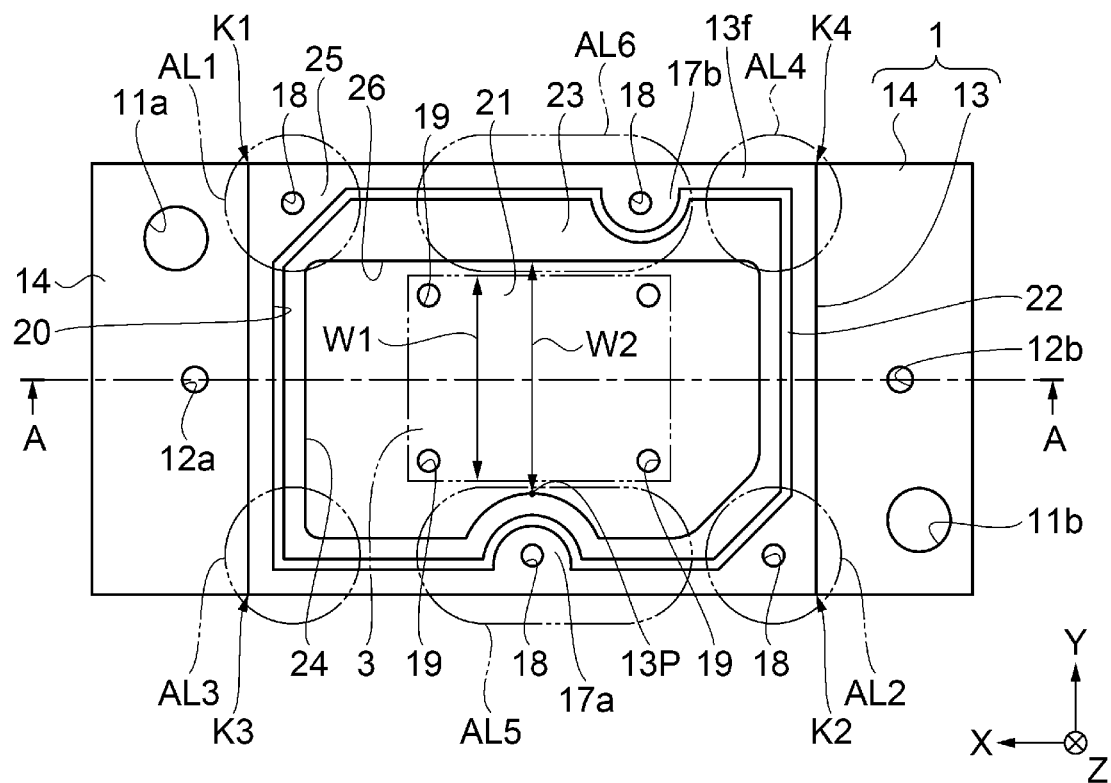
FIG. 5 is a plan view showing an overview of a base.
Figure 6:
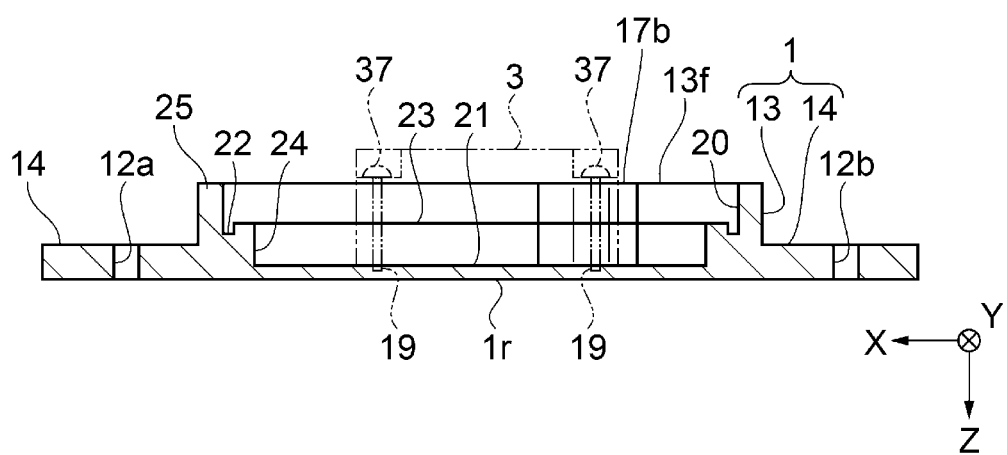
FIG. 6 is an A-A sectional view of FIG. 5 showing the overview of the base.
Figure 7:
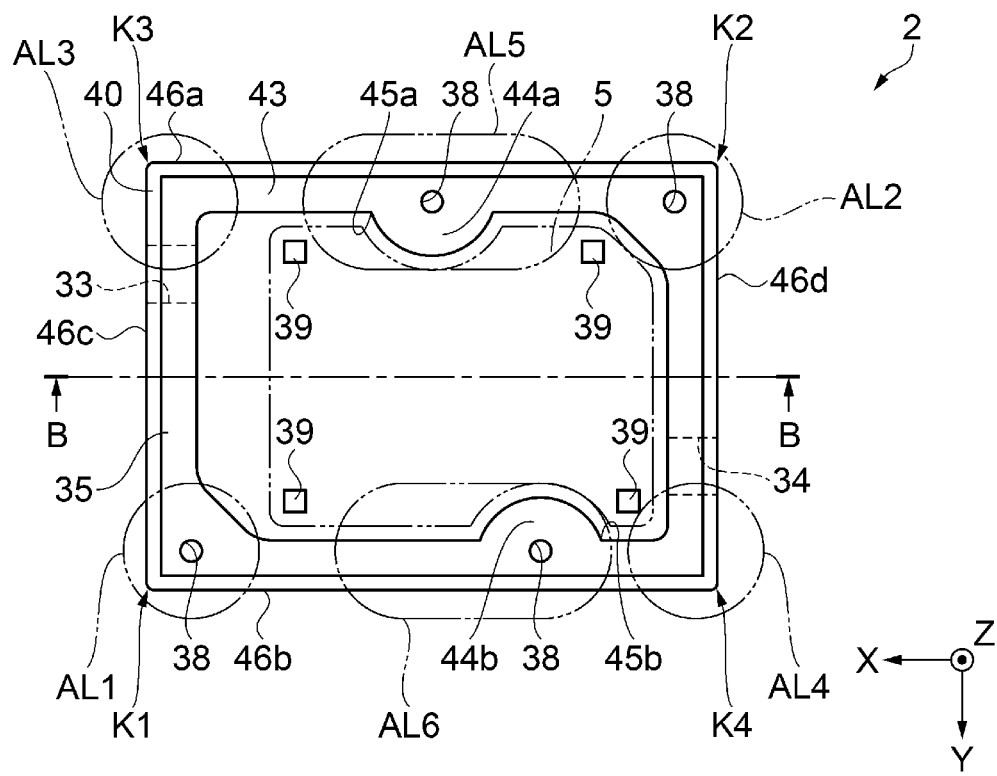
FIG. 7 is a plan view from an opening side showing an overview of a lid.
Figure 8:
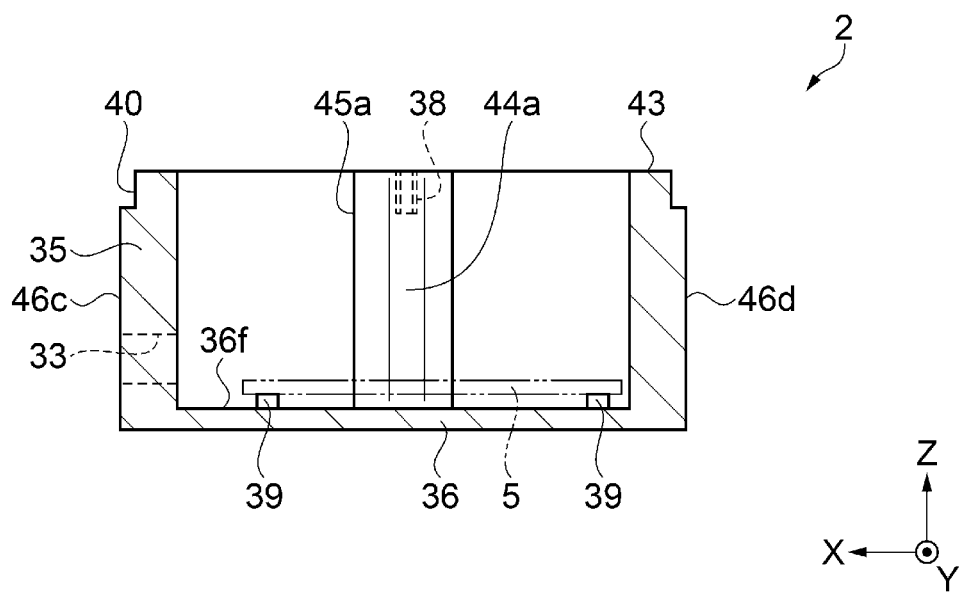
FIG. 8 is a B-B sectional view of FIG. 7 showing the overview of the lid.
Figure 9A:
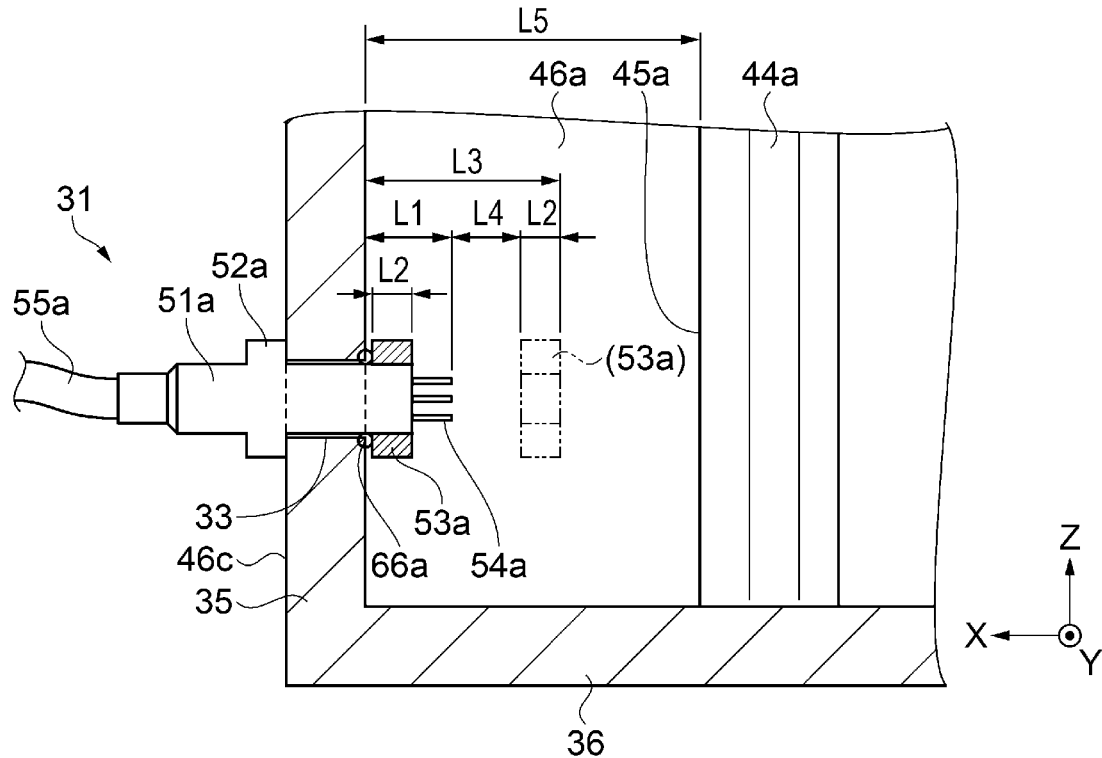
FIG. 9A is a sectional view from a D-D direction in FIG. 1 showing an attachment section of a first connector.
Figure 9B:
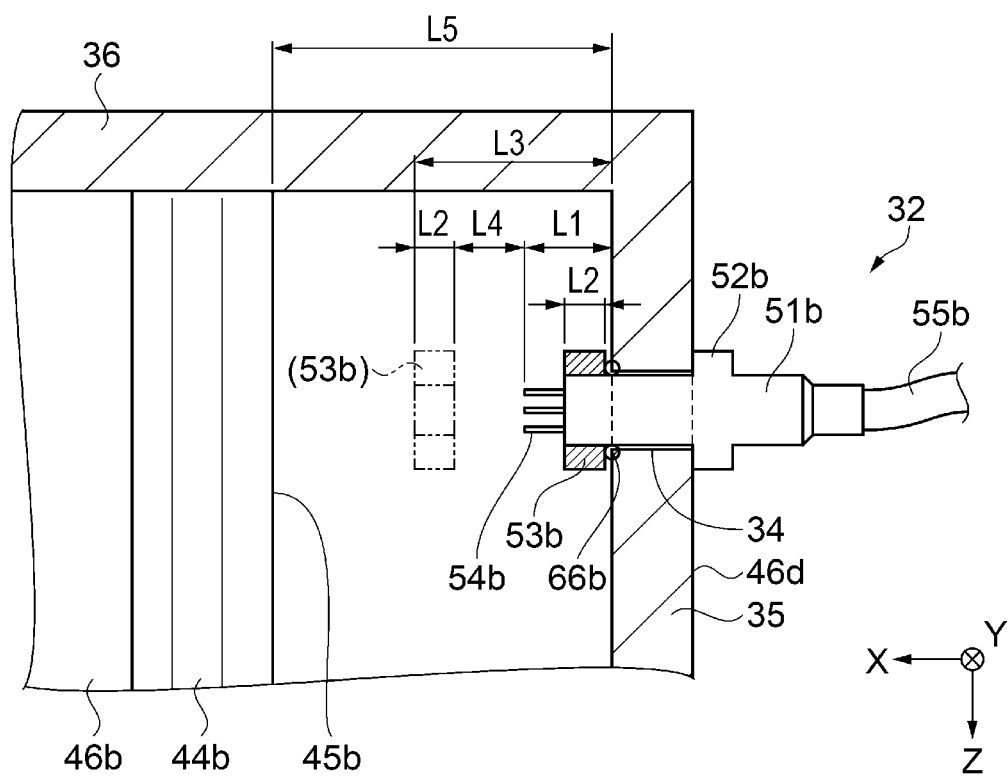
FIG. 9B is a sectional view from an F-F direction in FIG. 1 showing an attachment section of a second connector.

The configuration of the sensor unit is explained sequentially with reference to FIGS. 3, 4A, 4B, 5, 6, 7, 8, 9A, and 9B in addition to FIGS. 1 and 2. FIG. 3 is an exploded perspective view of the sensor unit in the same state as the state in FIG. 1. FIG. 4A is a plan view of the sensor unit. FIG. 4B is a sectional view of the sensor unit. In FIG. 4B, for convenience of explanation, the sensor unit is shown as a sectional view taken along (seen through) a third sidewall 46a of the lid, in other words, a schematic sectional view of the sensor unit cut in the Z-axis direction. FIG. 5 is a plan view showing an overview of the base. FIG. 6 is an A-A sectional view of FIG. 5 showing the overview of the base. FIG. 7 is a plan view from an opening side showing an overview of the lid. FIG. 8 is a B-B sectional view of FIG. 7 showing the overview of the lid. FIG. 9A is a sectional view from a D-D direction in FIG. 1 showing an attachment section of the first connector. FIG. 9B is a sectional view from an F-F direction in FIG. 1 showing an attachment section of the second connector.

As shown in FIG. 3, the sensor unit 100 is configured from the base 1, the lid 2, the inertial sensor 3, a control circuit board 4, an I/F (interface) circuit board 5, the seal member 6, the first connector 31, the second connector 32, and the like. In detail, in the sensor unit 100, the inertial sensor 3, the control circuit board 4, and the I/F circuit board 5 are housed on the inside (in a housing space) of the container 7 configured from the base 1 and the lid 2. The sensor unit 100 can transmit and receive signals to and from the outside through the first connector 31 and the second connector 32 attached to the lid 2.

In the sensor unit 100, as shown in FIGS. 3, 4A, and 4B, the inertial sensor 3 is attached to a bottom surface 21 of a second recessed section 24 provided in a housing section 13 of the base 1. The control circuit board 4 is attached to an upper surface, which is a surface on the opposite side of a surface opposed to the bottom surface 21 of the inertial sensor 3. The control circuit board 4 is connected to a connector 65 of the inertial sensor 3 and electrically connected and attached to the inertial sensor 3. A control circuit element 51 and a plurality of electronic components 52 are mounted on the control circuit board 4. The control circuit element 51 is, for example, a MCU (Micro Controller Unit). The control circuit element 51 incorporates a storing section including a nonvolatile memory, an A/D converter, and the like. The control circuit element 51 can control the sections of the sensor unit 100.

In the sensor unit 100, the I/F (interface) circuit board 5 is attached to, by, for example, an adhesive or an attachment screw not shown in the figures, pedestals 39 provided on an internal bottom surface of a top wall 36 of the lid 2. The I/F circuit board 5 is electrically connected to the first connector 31 and the second connector 32 respectively by connection wires 56 and 57. The I/F circuit board 5 is electrically connected to the control circuit board 4 by a connection wire 59. The I/F circuit board 5 has an interface function between the sensor unit 100 and other sensors and circuit units.

Further, in the sensor unit 100, the first connector 31 is attached to a first sidewall 46c, which is a sidewall on one side of sidewalls opposed to each other on the side of the short side of the lid 2, and the second connector 32 is attached to a second sidewall 46d, which is a sidewall on the other side opposed to the first sidewall 46c. The first connector 31 and the second connector 32 are electrically connected to other sensor units, circuit control devices, and the like.

The rear surface 1r of the base 1 is set in contact with the mounting target surface 71 of the structure (the apparatus) and the fixing screws 70 are respectively inserted through and screwed in the first through-hole 11a and the second through-hole 11b, whereby the sensor unit 100 is fixed to the structure (the apparatus). The positioning holes 12a and 12b functioning as holes for positioning are respectively provided on the center sides in the Y-axis direction of the base 1 of the first through-hole 11a and the second through-hole 11b provided in the base 1. The positioning holes 12a and 12b can be caused to function as guide holes of the base 1. When the sensor unit 100 is attached to the mounting target surface 71, the positioning of the sensor unit 100 can be performed by, for example, inserting a position pin 72 projecting from the mounting target surface 71 into the sensor unit 100.

The lid 2 is fixed to the housing section 13 of the base 1 via the circumferential seal member 6 (see FIG. 3) by the screws 16 inserted through the second screw holes for fixing 18 (see FIG. 5) including the recessed sections (the dredged section) 15 provided in the four places of the base 1. Specific attachment positions of the lid 2 and the base 1 are explained in a latter part.

A strong material such as a stainless steel material is used as the base 1. The base 1 functions as an attachment member for the inertial sensor 3. When the lid 2 is attached to the base 1, the base 1 functions as the container 7 capable of maintaining airtightness from the outside. By forming the base 1 from the strong material such as the stainless steel material, it is possible to firmly fix the sensor unit 100 to the mounting target surface 71 (see FIG. 1) of the structure (the apparatus). It is possible to prevent deformation of the base 1 due to vibrations and shocks of the structure (the apparatus) from easily occurring. It is possible to reduce deterioration in detection accuracy due to deformation and slackening of fixing.

As shown in FIGS. 5 and 6, the base 1 is a plate member, a plane shape of which is a substantial rectangle. The housing section 13 is provided in the center in a direction along the long side (the X-axis direction). Fixed sections 14 functioning as fixed regions are provided on both sides of the housing section 13. That is, the fixed sections 14 functioning as the fixed regions are provided on the side of the first sidewall 46c of the lid 2, which is one sidewall of the opposed two sidewalls of the container 7, and the side of the second sidewall 46d of the lid 2, which is one sidewall of the opposed two sidewalls. In other words, the fixed sections 14 functioning as the fixed regions are disposed on both sides in the X-axis direction, which is the long side direction of the container 7. The lid 2 is attached to be opposed to the housing section 13 to configure the container 7. The container 7 has a rectangular shape, a plane shape of which is a substantial rectangle, in a plan view from the Z-axis direction. The first sidewall 46c and the second sidewall 46d are sidewalls on the side of the short side of the lid 2 configuring the container 7.

The housing section 13 projects to the lid 2 side from the fixed sections 14. A recessed section 20 opening to the lid 2 side is provided in the center region of a first surface 13f on a side to which the lid 2 is attached. A wall section 25 is configured in the outer peripheral section of the housing 13. The recessed section 20 includes a guide groove 22 of the circumferential seal member 6 provided along the inner wall of the recessed section 20, a first recessed section 23 provided on the inner side of the guide groove 22 along the guide groove 22, and a second recessed section 24 present on the inner side of the first recessed section 23 and having a bottom surface 21 further recessed than the first recessed section 23.

In the wall section 25, a corner section located in a first region AL1 of a first corner portion K1 on the first through-hole 11a side of the base 1 on the side of the first sidewall 46c of the lid 2 in a plan view of the attached lid 2 and a corner section located in a second region AL2 of a second corner portion K2 on the second through-hole 11b side of the base 1 on the side of the second sidewall 46d of the lid 2 in the plan view are formed in a triangular shape in the plan view. The second screw holes for fixing 18 of the lid 2 are respectively provided in the corner sections. In the wall section 25, a first protrusion 17a projecting to the inner side from the wall section 25 in an arcuate shape is provided in a fifth region AL5 closer to the second region AL2 side than a third region AL3 of a third corner portion K3 located on the opposite side of the first corner portion K1 in the Y-axis direction in the plan view. Further, a second protrusion 17b projecting to the inner side from the wall section 25 in an arcuate shape is provided in a sixth region AL6 closer to the first region AL1 side than a fourth region AL4 of a fourth corner portion K4 located on the opposite side of the second corner portion K2 in the Y-axis direction in the plan view. The second screw holes for fixing 18 for fixing the lid 2 are provided in the first protrusion 17a and the second protrusion 17b. That is, the second screw holes for fixing 18 of the lid 2 in the four places are provided on a surface on the opening side of the wall section 25. With such a configuration of the base 1, it is possible to surely attach the base 1 and the lid 2 in places including the first protrusion 17a and the second protrusion 17b.

The second recessed section 24 is recessed from the first recessed section 23 and has the bottom surface 21. Non-pierced four female screws 19 are provided on the bottom surface 21 of the second recessed section 24. The inertial sensor 3 is disposed in the second recessed section 24. Fixing screws 37 are tightened into the female screws 19, whereby the inertial sensor 3 is fixed to the bottom surface 21. Therefore, a width dimension W2 of the second recessed section 24 is set larger than a width dimension W1 of the inertial sensor 3. The width dimension W2 of the second recessed section 24 refers to a distance (a dimension) between a step wall 26, which is one inner surface of the second recessed section 24, and a top portion 13p of the first protrusion 17a projecting from a wall surface on a side opposed to the step wall 26. However, by setting the width dimension W2 of the second recessed section 24 slightly larger than the width dimension W1 of the inertial sensor 3, it is possible to reduce a wobble when the inertial sensor 3 is mounted and improve mountability of the inertial sensor 3.

The inertial sensor 3 is attached along the step wall 26 using at least any one of surfaces of the inner surface of the second recessed section 24, that is, in this embodiment, the step wall 26 as a mounting guide for the inertial sensor 3. In this way, the inertial sensor 3 is attached along at least the step wall 26, which is the sidewall on the inner side of the second recessed section 24 configuring the recessed section 20 provided in the center region of the first surface 13f on the side of the base 1 to which the lid 2 is attached. Consequently, it is possible to reduce fluctuation in fixing position accuracy of the inertial sensor 3.

The fixed sections 14 located on both the sides in the X-axis direction of the housing section 13 as the fixed regions function as flanges formed in a flat plate shape thinner than the housing section 13. In one fixed section 14, the first through-hole 11a piercing through the front and rear surfaces is provided in a position closer to one long side of the base 1. In the other fixed section 14, the second through-hole 11b piercing through the front and rear surfaces is provided in a position closer to the other long side of the base 1. That is, the first though-hole 11a and the second through-hole 11b are provided in positions substantially on a diagonal line with respect to the center in the plan view of the base 1.

On the respective center sides in the Y-axis direction of the first through-hole 11a and the second through-hole 11b provided in the base 1, the positioning holes 12a and 12b functioning as hole sections for positioning in the attachment of the sensor unit 100 to the mounting target section are provided in positions not overlapping the first through-hole 11a or the second through-hole 11b in the plan view. The positioning holes 12a and 12b may be through-holes piercing through the first surface 13f and the rear surface 1r functioning as the second surface in the front-rear relation with the first surface 13f or may be recessed sections provided on the rear surface 1r side. The positioning holes 12a and 12b functioning as base positioning sections can be caused to function as guide holes for positioning of the base 1. When the sensor unit 100 is attached to the mounting target surface 71, it is possible to perform positioning of the sensor unit 100 and accurately attach the sensor unit 100 to the mounting target surface 71 (the structure), for example, by inserting positioning pins (not shown in FIG. 5) into the positioning holes 12a and 12b.

The lid 2 is formed in a so-called box shape including a space having a recessed shape on the inside using, for example, aluminum. The lid 2 is formed in a recessed shape having an opening on one side. The lid 2 is disposed on the base 1 to close the opening. The lid 2 is attached to the housing section 13 of the base 1 via the circumferential seal member 6 by the four screws 16 (see FIG. 2). The lid 2 can be cut from an aluminum base material or can be formed using a die-cast method (a metal mold casting method). The material of the lid 2 is not limited to aluminum. Another kind of metal such as zinc or stainless steel, resin, a composite material of metal and resin, or the like may be used.

As shown in FIGS. 7 and 8, the lid 2 is a member having a recessed shape opening on the inner side of an opening surface 43 of a sidewall 35 extending from the top wall 36 formed in the rectangular shape in the plan view. In the lid 2, a recessed section 40 dug in a belt shape from the opening surface 43 to a predetermined position is provided on the outer surface of the sidewall 35 on the side of the opening section 43. The recessed section 40 is a part inserted through the wall section 25 of the housing section 13 when the lid 2 is attached to the base 1 (see FIG. 4B). The sidewall 35 of the lid 2 includes a first sidewall 46c functioning as a sidewall on one side of opposed sidewalls on the side of the short side of the lid 2 formed in the rectangular shape, a second sidewall 46d functioning as a sidewall on the other side of the opposed sidewalls on the side of the short side, a third sidewall 46a functioning as a sidewall on one side of the long side, and the fourth sidewall 46b functioning as a sidewall on the other side of the long side.

On the opening surface 43, a corner section located in the first region AL1 of the first corner portion K1 on the first through-hole 11a side of the base 1 at the time when the lid 2 is attached to the base 1 on the side of the first sidewall 46c in the plan view and a corner section located in the second region AL2 of the second corner portion K2 on the second through-hole 11b side of the base 1 on the side of the second sidewall 46d in the plan view are formed in a triangular shape in the plan view. Female screws 38 corresponding to the second screw holes for fixing 18 provided in the base 1 are respectively provided in the corner sections. On the opening surface 43, a third protrusion 44a projecting to the inner side from the third sidewall 46a in an arcuate shape is provided in the fifth region AL5 closer to the second region AL2 side than the third region AL3 of the third corner portion K3 located on the opposite side of the first corner portion K1 in the Y-axis direction in the third sidewall 46a in the plan view. Further, on the opening surface 43, a fourth protrusion 44b projecting to the inner side from the fourth sidewall 46b in an arcuate shape is provided in the sixth region AL6 closer to the first region AL1 side than the fourth region AL4 of the fourth corner portion K4 located on the opposite side of the second corner portion K2 in the Y-axis direction in the fourth sidewall 46b in the plan view. The female screws 38 corresponding to the second screw holes for fixing 18 provided in the base 1 are respectively provided in the third protrusion 44a and the fourth protrusion 44b.

The screws 16 inserted through from the base 1 side are screwed in the four female screws 38, whereby the lid 2 is attached to the base 1 via the circumferential seal member 6. In this way, the lid 2 is attached to the base 1 via the circumferential seal member 6 by the screws 16. Consequently, it is possible to easily attach the lid 2. Further, it is possible to improve airtightness in the attachment of the lid 2 and the base 1. It is possible to reduce deterioration in detection accuracy and degradation of components due to intrusion of damp and moisture into the inside of the container 7.

The attachment of the base 1 and the lid 2 is not limited to the screwing explained above and can be performed using a joining member, for example, an adhesive. In this case, the lid 2 can be attached to the base 1 by applying the adhesive functioning as the joining member between the lid 2 and the base 1 and solidifying the adhesive in a state in which the circumferential seal member 6 is pressed. Airtightness in the attachment of the lid 2 and the base 1 can be improved by such attachment.

Further, in the lid 2, the pedestals 39 in four places are provided on the inner surface of the top wall 36. The I/F circuit board 5 is attached to the pedestals 39. The I/F circuit board 5 can be attached by, for example, an adhesive or screws.

Further, in the lid 2, attachment holes 33 and 34, which are through-holes for respectively attaching the first connector 31 and the second connector 32, are respectively provided in the first sidewall 46c and the second sidewall 46d on the side of the short side. The attachment hole 33 provided in the first sidewall 46c is a hole for attachment of the first connector 31. The attachment hole 33 is provided in a position closer to the side of the third sidewall 46a, which is the side of one long side, in the Y-axis direction. The attachment hole 34 provided in the second sidewall 46d is a hole for attachment of the second connector 32. The attachment hole 34 is provided in a position closer to the side of the fourth sidewall 46b, which is the side of the other long side, in the Y-axis direction.

That is, when the lid 2 is attached to the base 1, the attachment hole 33 is disposed closer to the side of the sidewall on the side of the other long side than the center in the Y-axis direction with respect to the first through-hole 11a disposed closer to the sidewall on the side of one long side than the center in the Y-axis direction. When the lid 2 is attached to the base 1, the attachment hole 34 is disposed closer to the side of the sidewall on the side of one long side than the center in the Y-axis direction with respect to the second through-hole 11b disposed closer to the side of the sidewall on the side of the other long side than the center in the Y-axis direction. In other words, in the plan view from the Z-axis direction, the attachment holes 33 and 34 are provided in positions where, when the lid 2 is attached to the base 1, the first connector 31 does not overlap the first through-hole 11a for attachment of the sensor unit 100 (the base 1) in the plan view and the second connector 32 does not overlap the second through-hole 11b for attachment of the sensor unit 100 (the base 1) in the plan view.

By disposing the attachment holes 33 and 34 and the first through-hole 11a and the second through-hole 11b for attachment of the base 1 in this way, when the sensor unit 100 is attached to the structure, it is possible to easily tighten the fixing screws 70 without being hindered (interfered) by the first connector 31 and the second connector 32. Therefore, by applying such disposition of the attachment holes 33 and 34 and the first through-hole 11a and the second through-hole 11b for attachment of the base 1, it is possible to reduce the dimension in the width direction (the Y-axis direction) in the sensor unit 100 in which the first connector 31 and the second connector 32 are disposed in series.

As shown in FIG. 9A, the first connector 31 is attached to the attachment hole 33 provided in the first sidewall 46c in the sidewall 35 of the lid 2. The first connector 31 is attached to the lid 2 by disposing a wire 55a on the outer side of the first sidewall 46c and disposing a connection terminal 54a on the inner side of the first sidewall 46c. Specifically, the first connector 31 is attached to the first sidewall 46c by inserting a main body section 51a into the attachment hole 33, bringing an external nut section 52a into contact with the outer side of the first sidewall 46c, and tightening the main body section 51*a* with a lock nut 53*a* via the first seal ring 66*a* such as an O ring functioning as a seal member on the inner side. In the attachment of the first connector 31, the tightening via the first seal ring 66*a* is performed. Consequently, it is possible to maintain airtightness inside the container 7 and reduce deterioration in detection accuracy and degradation of components due to intrusion of damp and moisture into the inside of the container 7.

In the attachment of the first connector 31, it is necessary to attach (screw) the lock nut 53*a* on the inner side of the first sidewall 46*c* to the main body section 51*a* further from the forward side than the distal end of the connection terminal 54*a*. In FIG. 9A, an insertion position of the lock nut 53*a* is indicated by an alternate long and two short dashes line. An attachment position of the first connector 31 is provided closer to the side of the third sidewall 46*a*. A space for attaching the lock nut 53*a* is necessary on the forward side of the distal end of the connection terminal 54*a*. The third protrusion 44*a* projecting from the opening surface 43 to the opening side in the arcuate shape is provided in the third region AL3 of the third sidewall 46*a*. However, the third protrusion 44*a* is disposed to be shifted in the X-axis direction to a position where a sufficient attachment space can be obtained in the attachment of the lock nut 53*a*. Specifically, the disposition of the third protrusion 44*a* is determined such that a distance L3 obtained by adding a distance L1 from the inner surface of the first sidewall 46*c* to the distal end of the connection terminal 54*a*, thickness L2 of the lock nut 53*a*, and a margin space distance L4 is smaller than a distance L5 from the inner surface of the first sidewall 46*c* to a projection base point 45*a* of the third protrusion 44*a*.

As shown in FIG. 9B, the second connector 32 is attached to the attachment hole 34 provided in the second sidewall 46*d* in the sidewall 35 of the lid 2. The second connector 32 is attached to the lid 2 with a wire 55*b* disposed on the outer side of the second sidewall 46*d* and with a connection terminal 54*b* disposed on the inner side of the second sidewall 46*d*. Specifically, the second connector 32 is attached to the first sidewall 46*c* by inserting a main body section 51*b* into the attachment hole 34, bringing an external nut section 52*b* into contact with the outer side of the second sidewall 46*d*, and tightening the main body section 51*b* with a lock nut 53*b* via the second seal ring 66*b* such as an O ring as a seal member on the inner side. In the attachment of the second connector 32, the tightening via the second seal ring 66*b* is performed. Consequently, it is possible to maintain airtightness inside the container 7 and reduce deterioration in detection accuracy and degradation of components due to intrusion of damp and moisture into the inside of the container 7.

In the attachment of the second connector 32, as in the attachment of the first connector 31, it is necessary to attach the lock nut 53*b* on the inner side of the second sidewall 46*d* to the main body section 51*b* further from the forward side than the distal end of the connection terminal 54*b*. An attachment position of the second connector 32 is provided closer to the side of the fourth sidewall 46*b*. A space for attaching the lock nut 53*b* is necessary on the forward side of the distal end of the connection terminal 54*b*. In FIG. 9B, an insertion position of the lock nut 53*b* is indicated by an alternate long and two short dashes line. The fourth protrusion 44*b* projecting from the opening surface 43 to the opening side in the arcuate shape is provided in the fourth region AL4 of the fourth sidewall 46*b*. However, the fourth protrusion 44*b* is disposed to be shifted in the X-axis direction to a position where a sufficient attachment space can be obtained in the attachment of the lock nut 53*b*. Specifically, the disposition of the fourth protrusion 44*b* is determined such that a distance L3 obtained by adding a distance L1 from the inner surface of the second sidewall 46*d* to the distal end of the connection terminal 54*b*, thickness L2 of the lock nut 53*b*, and the margin space distance L4 is smaller than a distance L5 from the inner surface of the second sidewall 46*d* to a projection base point 45*b* of the fourth protrusion 44*b*.

In the above explanation of the embodiment, the rectangular base 1 and the recess-shaped lid 2, which is rectangular and having the recess, are used. However, the present disclosure is not limited to this. It goes without saying that external shapes of the base and the lid may be a circle, an ellipse, a trapezoid, a polygon, or a substantially rectangular shape including curve shapes such as a circle or an ellipse.

The container 7 is explained using the recess-shaped lid 2 and the base 1. However, the present disclosure is not limited to this. The container 7 may be a container in which an opening of a recessed section having a recess shape of a base is closed by a flat lid.

Configuration of the Inertial Sensor

Various motion sensors can be applied to the inertial sensor 3. In the following explanation, a so-called six-axis motion sensor including an angular velocity sensor that detects angular velocities of three axes and an acceleration sensor that detects accelerations of three axes and a so-called three-axis motion sensor including an acceleration sensor that detects accelerations of three axes are illustrated. The configurations of the six-axis motion sensor and the three-axis motion sensor are sequentially explained.

Six-Axis Motion Sensor

First, an inertial measurement unit (IMU), which is a six-axis motion sensor serving as an example of an inertial sensor, is explained with reference to FIGS. 10 and 11. FIG. is an exploded perspective view showing a schematic configuration of the inertial measurement unit. FIG. 11 is an exploded perspective view showing a disposition example of an inertial sensor element of the inertial measurement unit.

Figure 10:
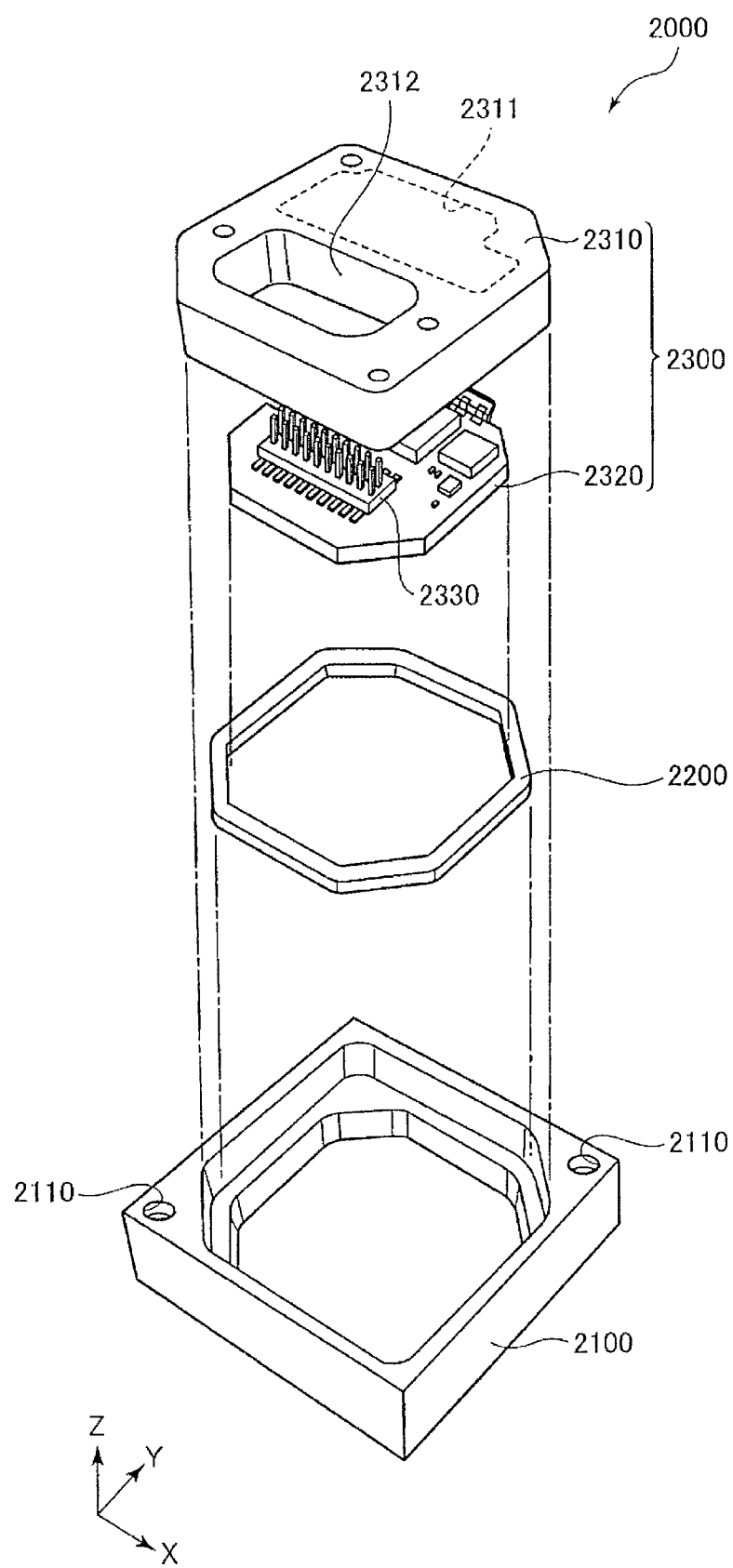
FIG. 10 is an exploded perspective view showing a schematic configuration of an inertial measurement unit functioning as an inertial sensor.
Figure 11:
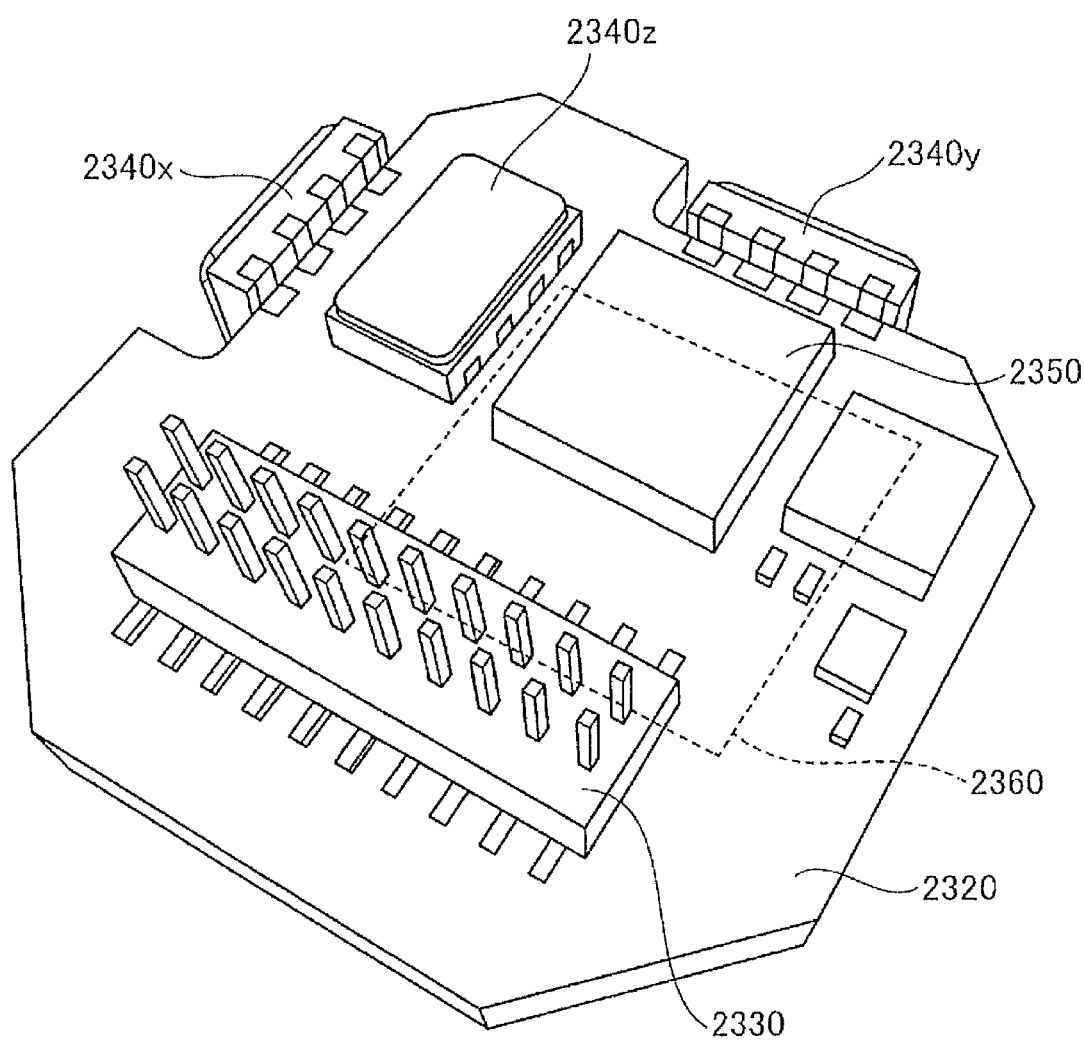
FIG. 11 is a perspective view showing a disposition example of an inertial sensor element of the inertial measurement unit.

An inertial measurement unit (IMU) 2000 shown in FIG. 10 is a device that detects a posture and a behavior (an inertial motion amount) of a mobile body (a mounting target apparatus) such as an automobile or a robot. The inertial measurement unit 2000 functions as a so-called six-axis motion sensor including a three-axis acceleration sensor and a three-axis angular velocity sensor. The inertial measurement unit 2000 can be applied as the inertial sensor 3 included in the sensor unit 100.

The inertial measurement unit 2000 is a rectangular parallelepiped, a plane shape of which is a substantial square. Screw holes 2110 functioning as fixing sections are formed near vertexes in two places located in a diagonal line direction of the square. The inertial measurement unit 2000 can be fixed to a mounting target surface of a mounting target apparatus such as an automobile or a robot by inserting two screws into the screw holes 2110 in the two places. It is also possible to reduce the inertial measurement unit 2000 to a size mountable on, for example, a smartphone and a digital camera through selection of components and a design change.

The inertial measurement unit 2000 includes an outer case 2100, a joining member 2200, and a sensor module 2300. The sensor module 2300 is inserted into the inside of the outer case 2100 with the intervention of the joining member 2200. The sensor module 2300 includes an inner case 2310 and a substrate 2320.

The external shape of the outer case 2100 is a rectangular parallelepiped, a plane shape of which is a substantial square, like the entire shape of the inertial measurement unit 2000. The screw holes 2110 are respectively formed near vertexes in two places located in a diagonal line direction of the square. The outer case 2100 has a box shape. The sensor module 2300 is housed on the inside of the outer case 2100.

The inner case 2310 is a member that supports the substrate 2320. The inner case 2310 is formed in a shape fit in the inside of the outer case 2100. In the inner case 2310, a recessed section 2311 for preventing contact with the substrate 2320 and an opening 2312 for exposing a connector 2330 explained below are formed. Such an inner case 2310 is joined to the outer case 2100 via the joining member 2200 (e.g., a gasket impregnated with an adhesive). The substrate 2320 is joined to the lower surface of the inner case 2310 via an adhesive.

As shown in FIG. 11, the connector 2330, an angular velocity sensor 2340z that detects angular velocity around the Z axis, an acceleration sensor 2350 that detects accelerations in the X-axis, Y-axis, and Z-axis directions, and the like are mounted on the upper surface of the substrate 2320. An angular velocity sensor 2340x that detects angular velocity around the X axis and an angular velocity sensor 2340y that detects angular velocity around the Y axis are mounted on side surfaces of the substrate 2320. The angular velocity sensors 2340z, 2340x, and 2340y are not particularly limited. A gyro sensor that makes use of the Coriolis force can be used. The acceleration sensor 2350 is not particularly limited. A capacitance-type acceleration sensor and the like can be used.

A control IC 2360 is mounted on the lower surface of the substrate 2320. The control IC 2360 is an MCU (Micro Controller Unit). The control IC 2360 incorporates a storing section including a nonvolatile memory, an A/D converter, and the like. The control IC 2360 controls the sections of the inertial measurement unit 2000. In the storing section, a computer program specifying order and content for detecting acceleration and angular velocity, a computer program for digitizing detection data and incorporating the detection data in packet data, accompanying data, and the like are stored. Besides, a plurality of electronic components are mounted on the substrate 2320.

Three-Axis Motion Sensor

The configuration of an acceleration sensor unit, which is a three-axis motion sensor serving as an example of an inertial sensor, is explained with reference to FIG. 12.

Figure 12:
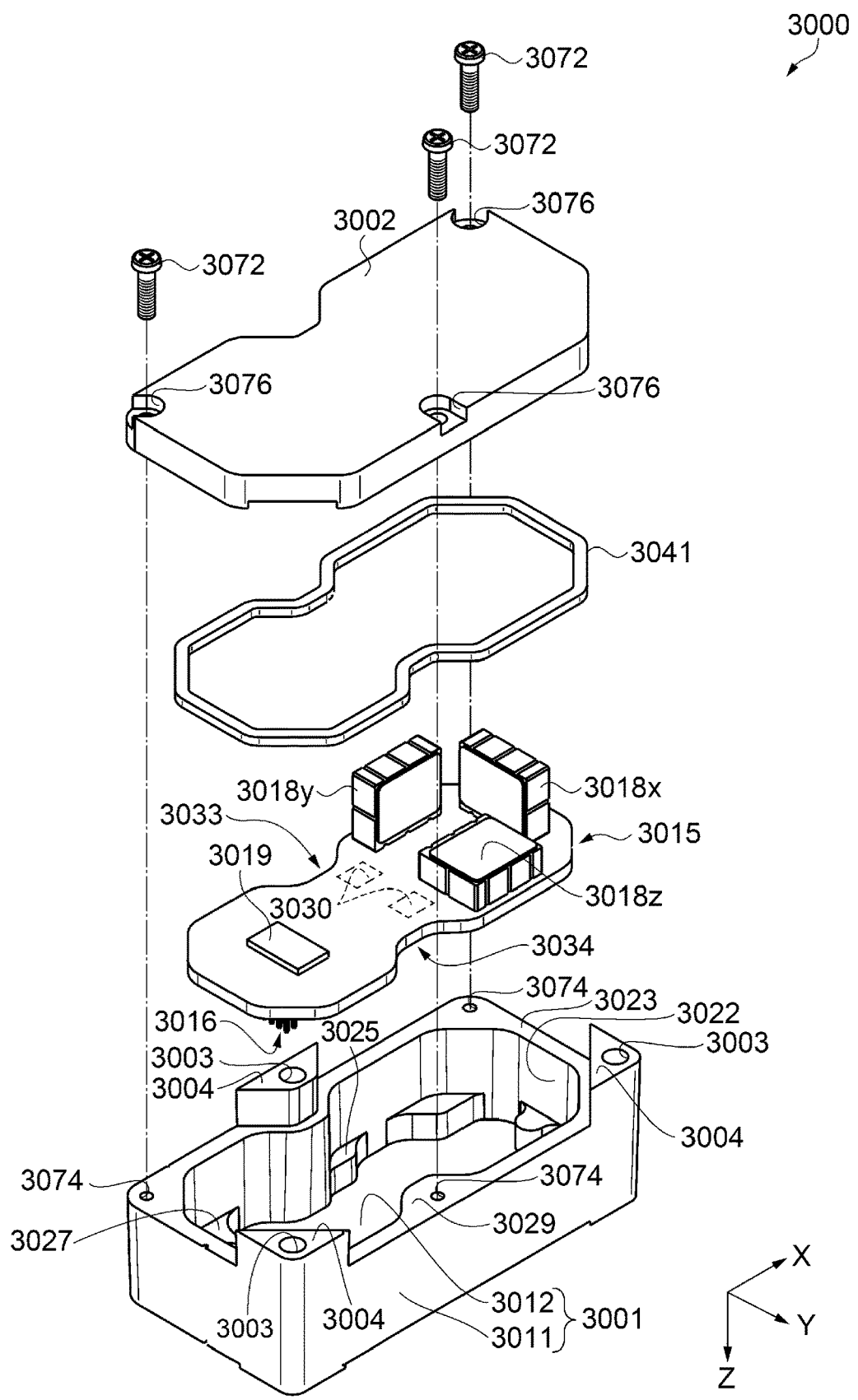
FIG. 12 is an exploded perspective view showing a schematic configuration of an acceleration sensor unit functioning as an inertial sensor.

An acceleration sensor device 3000 shown in FIG. 12 is a device that detects a posture (inclination) and a behavior (an inertial motion amount) of a structure such as a bridge or a building. The acceleration sensor device 3000 functions as a so-called three-axis motion sensor including a three-axis acceleration sensor. The acceleration sensor device 3000 can be applied as the inertial sensor 3 included in the sensor unit 100.

The acceleration sensor device 3000 is configured from a container 3001, a lid section 3002, a seal member 3041, a circuit board 3015, and the like. In detail, the acceleration sensor device 3000 has a configuration in which the circuit board 3015 is attached to the inside of the container 3001 with the intervention of a fixed member (not shown in FIG. 12) and an opening of the container 3001 is covered by the lid section 3002 via the seal member 3041.

The container 3001 is a member formed in a box shape having an internal space using, for example, aluminum and functioning as a housing container for the circuit board 3015. The material of the container 3001 is not limited to aluminum. Another kind of metal such as zinc or stainless steel, resin, a composite material of metal and resin, or the like may be used. The external shape of the container 3001 is a rectangular parallelepiped, a plane shape of which is a substantial rectangular. Fixed protrusions 3004 are provided in two places near respective end portions of one long side and one place in the center of the other long side. Screw holes 3003 are formed in the respective fixed protrusions 3004.

The container 3001 has a box shape, the external shape of which is a rectangular parallelepiped, opened on one side. The inside (the inner side) of the container 3001 is formed as an internal space (a housing space) surrounded by a bottom wall 3012 and a sidewall 3011. In other words, the container 3001 is formed in a box shape, one surface of which opposed to the bottom wall 3012 is an opening surface 3023. The outer edge of the circuit board 3015 is disposed (housed) along an inner surface 3022 of the sidewall 3011. The lid section 3002 is fixed to cover the opening. The opening surface 3023 opposed to the bottom wall 3012 is a surface on which the lid section 3002 is placed. On the opening surface 3023, the fixed protrusions 3004 are erected in two places near respective end portions of one long side of the container 3001 and one place in the center of the other long side of the container 3001. The upper surfaces (surfaces exposed in a −Z direction) of the fixed protrusions 3004 are surfaces substantially the same as the upper surface of the container 3001. The lid section 3002 is fixed to the container 3001 via the seal member 3041 by screws 3072 inserted through through-holes 3076 including recessed sections (dredged sections) provided in three places.

In the internal space (the housing space) of the container 3001, a protrusion 3029 that is present in the center of one long side in a position opposed to the fixed protrusion 3004 provided in the center of the other long side and projects to the internal space side from the sidewall 3011 in the bottom wall 3012 to the opening surface 3023 is provided. A female screw 3074 for fixing the lid section 3002 is provided on the upper surface (the same surface as the opening surface 3023) of the protrusion 3029. The protrusion 3029 and the fixed protrusion 3004 are provided in positions opposed to constricted sections 3033 and 3034 of the circuit board 3015.

In addition, a first pedestal 3027 and a second pedestal 3025 projecting in a higher stage shape from the bottom wall 3012 toward the opening surface 3023 side is provided in the internal space (the housing space) of the container 3001. The first pedestal 3027 is provided in a position opposed to a disposition region of a plug-type (male) connector 3016 attached to the circuit board 3015. An opening section (not shown in FIG. 12), into which the plug-type (male) connector 3016 is inserted, is provided in the first pedestal 3027. The first pedestal 3027 functions as a pedestal for fixing the circuit board 3015 to the container 3001 with a fixed member (not shown in FIG. 12) disposed around the plug-type (male) connector 3016. The opening section (not shown in FIG. 12) pierces through the surface on the inner side of the first pedestal 3027 and the lower surface, which is the outer surface, of the container 3001. That is, the opening section pieces through the inside (the inner side) and the outside of the container 3001.

The second pedestal 3025 is located on the opposite side of the first pedestal 3027 with respect to the fixed protrusion 3004 located in the center of the long side and is provided near the fixed protrusion 3004. The second pedestal 3025 may be coupled to the fixed protrusion 3004. The second pedestal 3025 functions as a pedestal for fixing the circuit board 3015 to the container 3001 on the opposite side of the first pedestal 3027 with respect to the fixed protrusion 3004. The second pedestal 3025 may be provided on the protrusion 3029 side.

In the example explained above, the external shape of the container 3001 is the box shape, the plane shape of which is the substantially rectangular parallelepiped, without a lid. However, the external shape of the container 3001 is not limited to this. The plane shape of the external shape of the container 3001 may be a square or a polygon such as a hexagon or an octagon or may be a plane shape in which corners of vertex portions of the polygon are chamfered or sides are curves. The plane shape of the inside (the inner side) of the container 3001 is not limited to the shape illustrated above and may be other shapes. The external shape of the container 3001 and the plane shape of the inside may be similar shapes or may not be similar shapes.

The circuit board 3015 functioning as the substrate is a multilayer substrate in which a plurality of through-holes and the like are formed. Acceleration sensors 3018x, 3018y, and 3018z and a control IC 3019 are mounted on one surface. The plug-type (male) connector 3016 is mounted on the other surface, which is the opposite surface. The circuit board 3015 includes the constricted sections 3033 and 3034, which are constricted outer edges of the circuit board 3015, in the center in the first direction (the X-axis direction) along the long side of the container 3001 in the plan view. Various wires, terminal electrodes, and the like are provided on the circuit board 3015. However, illustration and explanation of the wires, the terminal electrodes, and the like are omitted.

The circuit board 3015 is inserted into the internal space of the container 3001 with the other surface directed to the first pedestal 3027 and the second pedestal 3025. The circuit board 3015 is attached to, on the first pedestal 3027, the container 3001 by fixed members 3030 disposed between a fixed member (not shown in FIG. 12), which is disposed in a ring shape around the plug-type (male) connector 3016 in a region surrounding the outer edge of the attached plug-type (male) connector 3016, and the second pedestal 3025. That is, the circuit board 3015 is attached to the first pedestal 3027 and the second pedestal 3025 of the container 3001 via the fixed members 3042 and 3030.

The acceleration sensors 3018x, 3018y, and 3018z can respectively detect acceleration in one axis direction. As the acceleration sensors 3018x, 3018y, and 3018z, as a preferred example, a vibration-type acceleration sensor that detects acceleration using quartz as a transducer and based on a resonance frequency that changes according to a force applied to the transducer.

The acceleration sensor 3018x is erected with a side surface opposed to one surface of the circuit board 3015 such that the front and rear surfaces of a package face the X-axis direction. The acceleration sensor 3018x detects acceleration applied to the X-axis direction. The acceleration sensor 3018y is erected with a side surface opposed to one surface of the circuit board 3015 such that the front and rear surfaces of a package face the Y-axis direction. The acceleration sensor 3018y detects acceleration applied to the Y-axis direction. The acceleration sensor 3018z is connected such that the front and rear surfaces of a package faces the Z-axis direction, that is, the front and rear surfaces are right opposed to one surface of the circuit board 3015. The acceleration sensor 3018z detects acceleration applied to the Z-axis direction.

The acceleration sensors 3018x, 3018y, and 3018z are not limited to the vibration-type acceleration sensor using quartz and only have to be a sensor capable of detecting acceleration. Another sensor may be, for example, a capacitance-type acceleration sensor, a piezo-resistance-type acceleration sensor, or a heat-detection-type acceleration sensor obtained by machining a silicon substrate with an MEMS technique. The acceleration sensors 3018x, 3018y, and 3018z are not limited to the configuration in which the three acceleration sensors 3018x, 3018y, and 3018z for each axis are used. The acceleration sensors 3018x, 3018y, and 3018z only have to be a sensor capable of detecting accelerations of three axes. For example, a sensor device capable of detecting (sensing) accelerations of three axes with one device (package) may be used.

With the sensor unit 100 explained above, the first connector 31 is attached closer to the third sidewall 46a on one side of the long side in the first sidewall 46c of the lid 2 on the side of the short side of the rectangular sensor unit 100 in the plan view. The second connector 32 is attached closer to the fourth sidewall 46b on the other side of the long side in the second sidewall 46d opposed to the first sidewall 46c. In the fixed region attached to the mounting target section, in the fixed region on the side of the first sidewall 46c functioning as one of the opposed sidewalls, the first through-hole 11a is provided closer to the side of the fourth sidewall 46b such that at least apart of the first through-hole 11a does not overlap the first connector 31 in the plan view. In the fixed region on the side of the second sidewall 46d functioning as the other sidewall, the second through-hole 11b is provided closer to the side of the third sidewall 46a such that at least a part of the second through-hole 11b does not overlap the second connector 32 in the plan view. That is, the first connector 31 and the second connector 32 are disposed on a first diagonal line of the sensor unit 100. The first through-hole 11a and the second through-hole 11b, which are attachment sections to the mounting target section, are disposed on a second diagonal line in the opposite position of the first diagonal line of the sensor unit 100. Consequently, it is possible to reduce a width dimension, which is a dimension in the second direction (the Y-axis direction), of the sensor unit 100 including the two connectors (the first connector 31 and the second connector 32) that can be connected in series. That is, the shape of the sensor unit 100 can be configured compact. Consequently, even when the mounting target section needs to be set in a plurality of places in a movable region of, for example, an arm section of a hydraulic shovel, the sensor units 100 set in the places can be connected in series by a cable. That is, the sensor units 100 can be connected by one wire. Therefore, it is possible to make it compact to draw around the cable in the movable region.

Since the sensor unit 100 can be made compact, even when the mounting target section needs to be set in a plurality of places in an extremely limited region such as an arm section of a hydraulic shovel, it is possible to connect a plurality of sensor units 100 in series (multi-connect the plurality of sensor units 100) and dispose the sensor units 100 compactly for each of setting places of the sensor units 100. By multi-connecting the plurality of sensor units 100 in this way, an SN ratio of a detection signal is improved and a noise component can be reduced. Therefore, it is possible to improve detection accuracy of the sensor unit 100.

The lid 2 and the base 1 are attached in the first region AL1 of the first corner portion K1 and the second region AL2 of the second corner portion K2 on the side of the first through-hole 11a and the side of the second through-hole 11b. Therefore, the sensor unit 100 including the two connectors (the first connector 31 and the second connector 32) can be configured compact without affecting the disposition of the first connector 31 and the second connector 32.

On the side of the long side of the lid 2 to which the first connector 31 and the second connector 32 are closer, the lid 2 and the base 1 are attached in the fifth region AL5 closer to the side of the second region AL2 than the third region AL3 of the third corner portion K3 and the sixth region AL6 closer to the side of the first region AL1 than the second region AL4 of the fourth corner portion K4. Therefore, it is possible to eliminate interference with the lid 2 when the first connector 31 and the second connector 32 are attached. The sensor unit 100 including the two connectors (the first connector 31 and the second connector 32) can be configured compact.

Modification Related to the Configuration of the Sensor Unit

Figure 13:
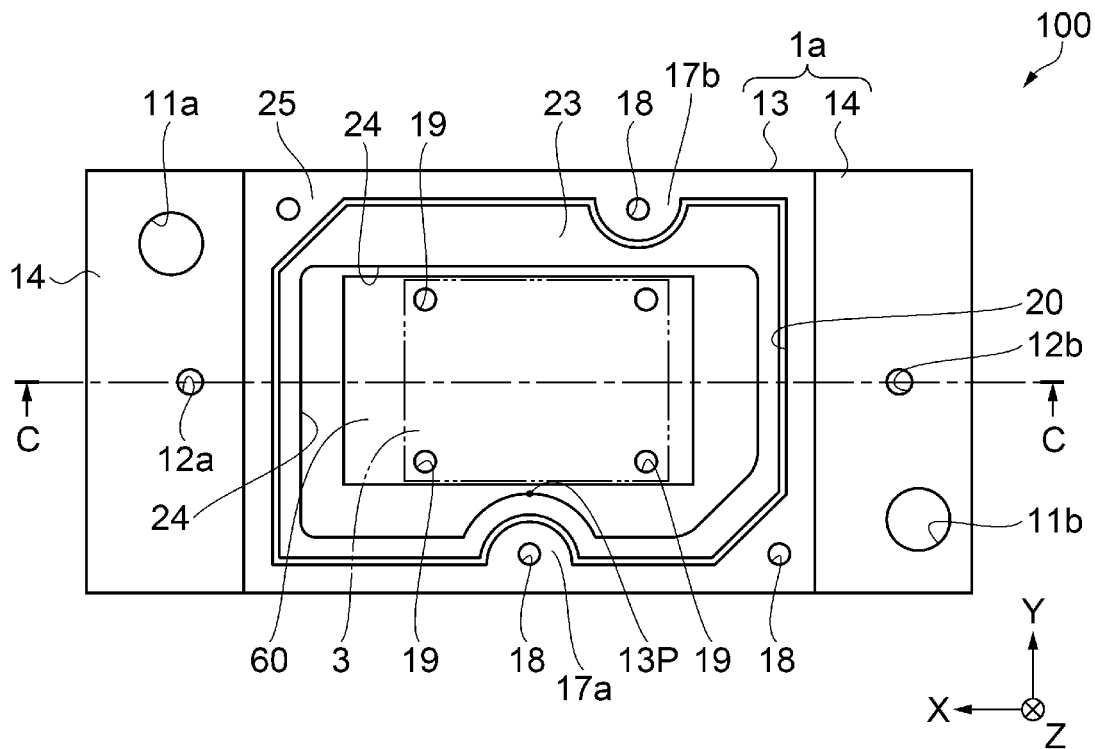
FIG. 13 is a plan view showing an overview of a base according to a modification.
Figure 14:
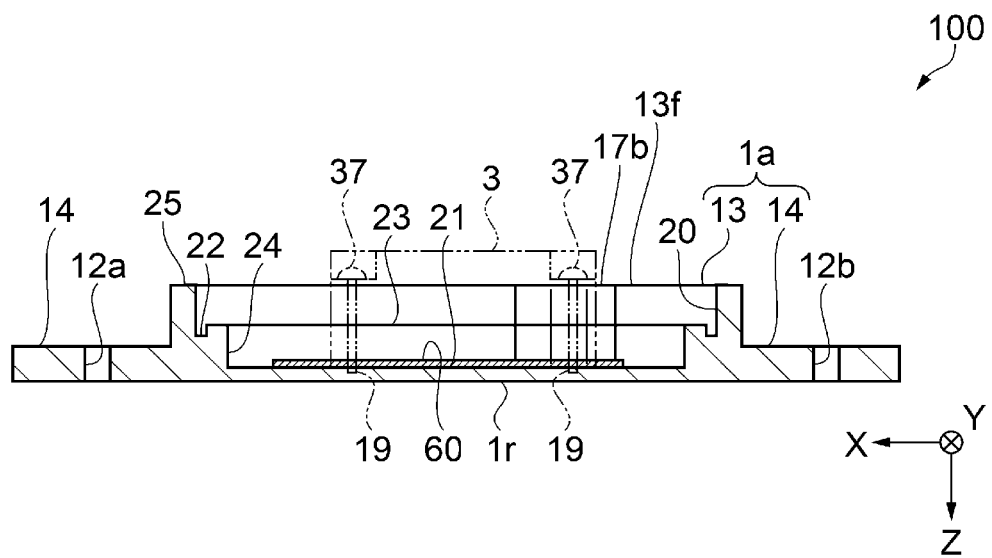
FIG. 14 is a C-C sectional view of FIG. 13 showing the overview of the base according to the modification.

In the configuration of the sensor unit 100, a change such as addition of constituent members can be performed. In the following explanation, an example of a modification related to the configuration of the sensor unit is explained with reference to FIGS. 13 and 14. FIG. 13 is a plan view showing an overview of a base according to the modification. FIG. 14 is a C-C sectional view of FIG. 13 showing the overview of the base according to the modification. The same components as the components of the base 1 explained in the embodiment are denoted by the same reference numerals and signs and explanation of the components is omitted.

A base 1a of the sensor unit 100 according to the modification is different from the configuration of the base 1 explained in the embodiment in that a cushioning member 60 is provided between the inertial sensor 3 and the bottom surface 21 of the second recessed section 24.

The cushioning member 60 is configured by a member having a modulus of elasticity smaller than the modulus of elasticity of the material of the base 1a. As the cushioning member 60, a resin plate including, for example, silicone-based, epoxy-based, or urethane-based resin as a base material or a rubber plate including rubber as a base material can be used. The cushioning member 60 can be provided by applying a resin adhesive or the like. The inertial sensor 3 is disposed in the second recessed section 24. The fixing screws 37 are screwed in the female screws 19 of the base 1a, whereby the inertial sensor 3 is fixed to the bottom surface 21 via the cushioning member 60.

In this way, the inertial sensor 3 is attached to the bottom surface 21 of the second recessed section 24 of the base 1a via the cushioning member 60 having the modulus of elasticity smaller than the modulus of elasticity of the material of the base 1a. Consequently, the cushioning member 60 can be caused to function as a vibration proof member or a cushioning member. It is possible to prevent shocks and vibrations applied to the sensor unit 100 from being transmitted to the inertial sensor 3 as noise vibration.

The cushioning member 60 is configured by one plate disposed to overlap the entire region of the inertial sensor 3 in the plane view. However, the cushioning member 60 is not limited to this. The cushioning member 60 may be configured by a plurality of plates, protrusions, or the like having a modulus of elasticity smaller than the modulus of elasticity of the material of the base 1a.

Construction Machine

Figure 15:
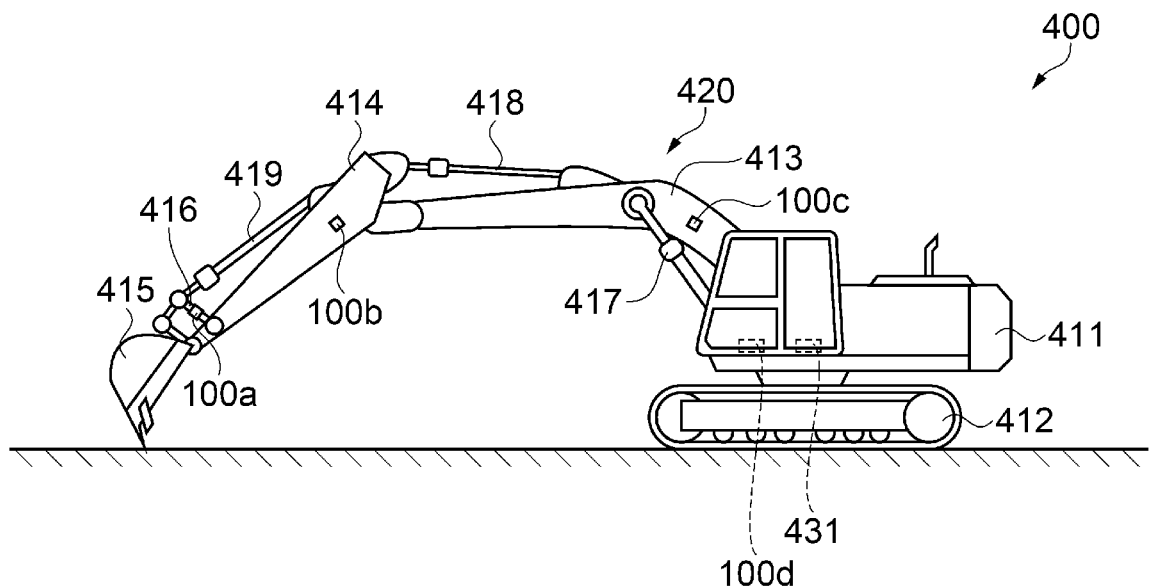
FIG. 15 is a schematic diagram showing a hydraulic shovel including the sensor unit.
Figure 16:
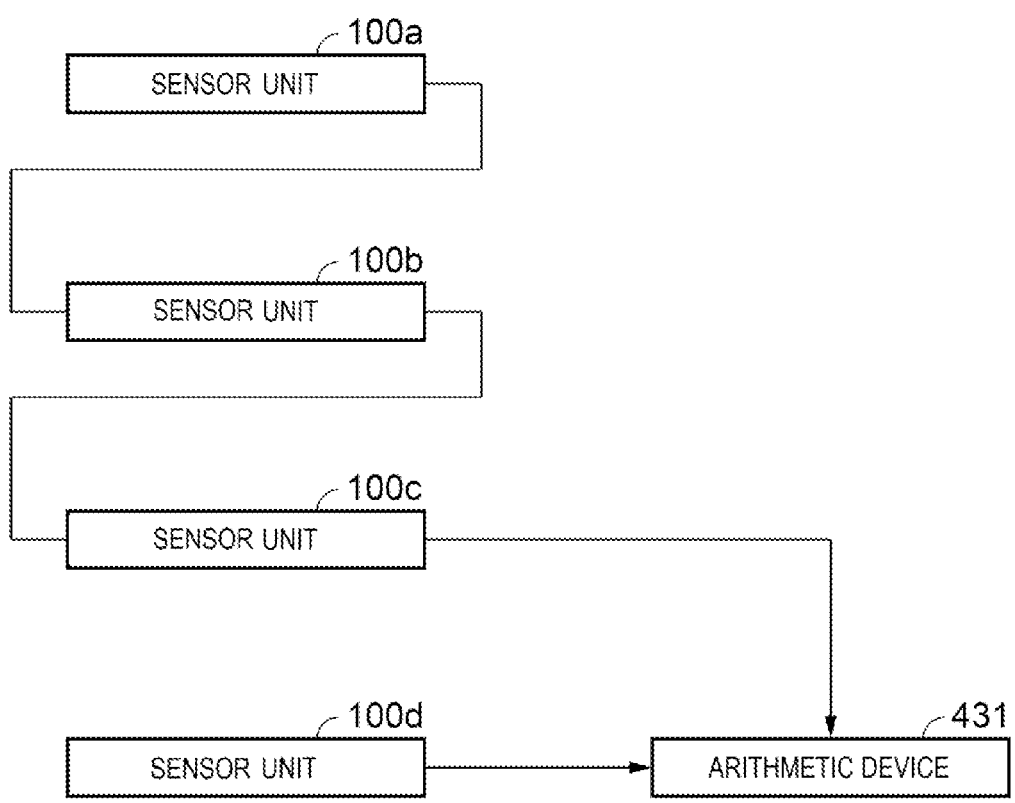
FIG. 16 is a block diagram showing a connection configuration of the sensor unit.

The sensor unit 100 according to the embodiment explained above can be effectively used in posture control and the like for a construction machine. In the following explanation, a hydraulic shovel 400 is illustrated and explained as an example of the construction machine with reference to FIGS. 15 and 16. FIG. 15 is a schematic diagram showing a hydraulic shovel including a sensor unit. FIG. 16 is a block diagram showing a connection configuration of the sensor unit.

As shown in FIG. 15, a vehicle body of the hydraulic shovel 400 is configured by a lower traveling body 412 and an upper pivoting body 411 pivotably mounted on the lower traveling body 412. A work mechanism 420 configured by a plurality of members turnable in the up-down direction is provided on the front side of the upper pivoting body 411. A driver's seat (not shown in FIG. 15) is provided in the upper pivoting body 411. An operation device (not shown in FIG. 15) for operating members configuring the work mechanism 420 is provided in the driver's seat. A sensor unit 100d functioning as an inclination sensor that detects an inclination angle of the upper pivoting body 411 is disposed in the upper pivoting body 411.

The work mechanism 420 includes, as a plurality of members, a boom 413 elevatably attached to the front side of the upper pivoting body 411, an arm 414 elevatably attached to the distal end side of the boom 413, a bucket link 416 turnably attached to the distal end side of the arm 414, a bucket 415 turnably attached to the distal end side of the arm 414 and the bucket link 416, a boom cylinder 417 that drives the boom 413, an arm cylinder 418 that drives the arm 414, and a bucket cylinder 419 that drives the bucket 415 via the bucket link 416.

The proximal end side of the boom 413 is supported by the upper pivoting body 411 turnably in the up-down direction. The boom 413 is driven to relatively rotate with respect to the upper pivoting body 411 according to stretching and shrinking of the boom cylinder 417. A sensor unit 100c functioning as an inertial sensor that detects a state of movement of the boom 413 is disposed in the boom 413.

One end side of the arm 414 is rotatably supported on the distal end side of the boom 413. The arm 414 is driven to relatively rotate with respect to the boom 413 according to stretching and shrinking of the arm cylinder 418. A sensor unit 100b functioning as an inertial sensor that detects a state of movement of the arm 414 is disposed in the arm 414.

The bucket link 416 and the bucket 415 are turnably supported on the distal end side of the arm 414. The bucket link 416 is driven to relatively rotate with respect to the arm 414 according to stretching and shrinking of the bucket cylinder 419. The bucket 415 is driven to relatively rotate with respect to the arm 414 in association with the relative rotation of the bucket link 416. A sensor unit 100a functioning as an inertial sensor that detects a state of movement of the bucket link 416 is disposed in the bucket link 416.

As the sensor units 100a, 100b, 100c, and 100d, the sensor unit 100 explained in the embodiment can be used. The sensor units 100a, 100b, 100c, and 100d can detect at least one of angular velocity and acceleration acting on the members of the work mechanism 420 and the upper pivoting body 411. As shown in FIG. 16, the sensor units 100a, 100b, and 100c are connected in series and can transmit detection signals to an arithmetic device 431. The sensor units 100a, 100b, and 100c are connected in series in this way. Consequently, it is possible to reduce the number of wires for transmitting detection signals in the movable region and obtain a compact wiring structure. The compact wiring structure makes it easy to select a laying method for the wires. It is possible to reduce occurrence of degradation, damage, and the like of the wires.

Further, in the hydraulic shovel 400, as shown in FIG. 15, the arithmetic device 431 that calculates an inclination angle of the upper pivoting body 411 and positions and postures of the boom 413, the arm 414, the bucket 415 configuring the work mechanism 420 is provided. The arithmetic device 431 receives inputs of various detection signals from the sensor units 100a, 100b, 100c, and 100d and calculates positions and postures (posture angles) of the boom 413, the arm 414, and the bucket 415 and an inclination state of the upper pivoting body 411 based on the various detection signals. Position and posture signals including the calculated posture angles of the boom 413, the arm 414, and the bucket 415, an inclination signal including the calculated inclination state of the upper pivoting body 411, for example, a position and posture signal of the bucket 415 are used in feedback information for controlling display of a monitor device (not shown in FIG. 15) in the driver's seat or the operation of the work mechanism 420 and the upper pivoting body 411.

The sensor unit 100 (100a, 100b, 100c, and 100d) applied to the construction machine can also be applied to, for example, a rough terrain crane (a crane truck), a bulldozer, a drilling machine/a loading machine, a wheel loader, and a high lift work vehicle (a lift vehicle) besides the hydraulic shovel (a yumbo, a backhoe, or a power shovel) illustrated above.

The hydraulic shovel 400 explained above is equipped with the compact sensor unit 100 including the two connectors (the first connector 31 and the second connector 32: see FIG. 1). Therefore, for example, a construction machine can be provided in which, even in an extremely limited narrow region such as the bucket link 416, it is possible to connect a plurality of sensor units 100 in series (multi-connect the plurality of sensor units 100) and dispose the sensor units 100 compactly for each of setting places of the sensor units 100 or it is possible to make it compact to draw around a cable that connects, in series, the sensor units 100 set in the respective places.

The sensor unit 100 can be used in, for example, posture control of a bipedal walking robot, a train, and the like, posture control of remote-controlled or autonomous flying objects such as a radio-controlled airplane, a radio-controlled helicopter, and a drone, posture control of an agriculture machine and a construction machine, and control of a rocket, an artificial satellite, a ship, an AGV (automatic guided vehicle), and the like besides the control of the construction machine illustrated above.

Structure Monitoring Device

Figure 17:
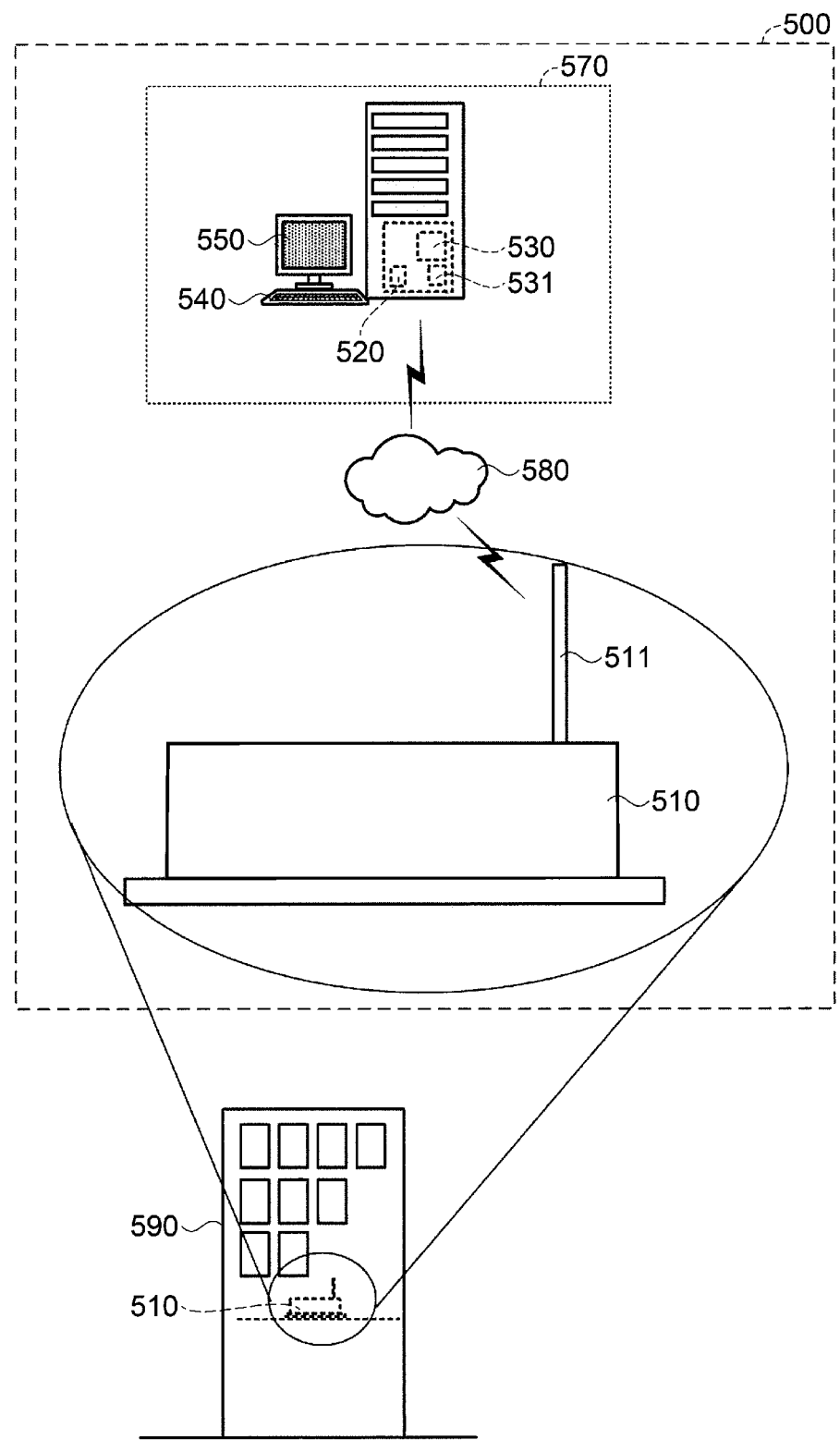
FIG. 17 is a configuration diagram showing a structure monitoring device including the sensor unit.

A structure monitoring device (SHM: Structural Health Monitoring) 500 is shown in FIG. 17. The structure monitoring device 500 has the same structure as the structure of the sensor unit 100 in the embodiment explained above. The structure monitoring device 500 includes a physical quantity sensor device 510 attached to a structure 590 set as a monitoring target. The physical quantity sensor device 510 includes a transmitting section 511 that transmits a detection signal. The transmitting section 511 may be realized as a communication module and an antenna separate from the physical quantity sensor device 510.

The physical quantity sensor device 510 is connected to, for example, a monitoring computer 570 via a wireless or wired communication network 580. The monitoring computer 570 includes a receiving section 520 connected to the physical quantity sensor device 510 via the communication network 580 and a calculating section 530 that calculates, based on a signal output from the receiving section 520, an inclination angle of the structure 590.

In this embodiment, the calculating section 530 is realized by an ASIC (Application Specific Integrated Circuit), an FPGA (Field Programmable Gate Array), or the like mounted on the monitoring computer 570. However, the calculating section 530 may be a processor such as a CPU (Central Processing Unit). The processor may perform arithmetic processing of a computer program stored in an IC memory 531 to thereby realize the calculating section 530 in a software manner. The monitoring computer 570 can receive various operation inputs of an operator through a keyboard 540 and display a result of the arithmetic processing on a touch panel 550.

The structure monitoring device 500 in this embodiment monitors inclination of the structure 590 using the sensor unit 100 in the embodiment explained above. Therefore, the structure monitoring device 500 can be provided in which, even in an extremely limited narrow region, it is possible to connect a plurality of sensor units 100 in series (multi-connect the plurality of sensor units 100) and dispose the sensor units 100 compactly for each of setting places of the sensor units 100 or it is possible to make it compact to draw around a cable that connects, in series, the sensor units 100 set in the respective places.

Contents derived from the embodiment explained above are described below as aspects.

First Aspect

A sensor unit according to a first aspect includes: a container including a base and a lid attached to the base to configure a housing space on an inside; an inertial sensor housed in the housing space; and a first connector and a second connector attached to the container. The container includes: a first sidewall and a second sidewall opposed to each other; a third sidewall connected to one end of the first sidewall and one end of the second sidewall; and a fourth sidewall connected to another end of the first sidewall and another end of the second sidewall and opposed to the third sidewall. The first connector is attached to the first sidewall and disposed further on a side of the fourth sidewall than a side of the third sidewall. The second connector is attached to the second sidewall and disposed further on the side of the third sidewall than the side of the fourth sidewall.

According to this aspect, the first connector is attached to the first sidewall further on the side of the fourth sidewall than the side of the third sidewall. The second connector is attached to the second sidewall further on the side of the third sidewall than the side of the fourth sidewall. That is, the first connector and the second connector are disposed along one diagonal line located on the side of the first sidewall and the second sidewall of the sensor unit. Therefore, the sensor unit including the two connectors can be configured compact. Consequently, even when sensor units need to be set in a plurality of places, for example, in an arm section of a hydraulic shovel, the sensor units set in the places can be connected in series by a cable. It is possible to make it compact to draw around a cable.

Since the sensor unit can be made compact, even in an extremely limited region such as an arm section of a hydraulic shovel, it is possible to connect a plurality of sensor units in series (multi-connect the plurality of sensor units) and dispose the sensor units compactly for each of setting places of the sensor units. By multi-connecting the plurality of sensor units in this way, an SN ratio of a detection signal is improved and a noise component can be reduced. Therefore, it is possible to improve detection accuracy of the sensor unit.

Second Aspect

In the sensor unit according to the first aspect, in the base, fixed regions attached to amounting target section may be respectively provided on sides of opposed two sidewalls of the container in a plan view, a first through-hole may be provided in the fixed region on the side of one sidewall of the two sidewalls, and a second through-hole may be provided in the fixed region on the side of another sidewall of the two sidewalls.

According to this aspect, the sensor unit is fixed to the mounting target section in the fixed regions respectively provided on the sides of the opposed two sidewalls of the container. That is, the sensor unit can be fixed to the mounting target sections using the first through-hole and the second through-hole at end portions on both sides of the base. Therefore, it is possible to firmly and surely fix the sensor unit.

Third Aspect

In the sensor unit according to the second aspect, the one sidewall may be the first sidewall, the other sidewall may be the second sidewall, the first connector may not overlap the first through-hole in the plan view, and the second connector may not overlap the second through-hole in the plan view.

According to this aspect, in the fixed regions attached to the mounting target section, the first through-hole is provided in the fixed region on the side of the first sidewall not to overlap the first connector in the plan view and the second through-hole is provided in the fixed region on the side of the second sidewall not to overlap the second connector in the plan view. The first through-hole and the second through-hole function as holes for attaching the sensor unit to the mounting target section. Therefore, by disposing the first through-hole and the second through-hole in this way, in inserting fixing screws or the like used when the sensor unit is attached to the mounting target section, it is possible to prevent interference between the fixing screws and the first connector and the second connector. The sensor unit including the two connectors can be configured compact.

Fourth Aspect

In the sensor unit according to the third aspect, the container may have a rectangular shape in the plan view, and the first sidewall and the second sidewall may be sidewalls on a side of a short side of the container.

According to this aspect, the first connector, the second connector, the first through-hole, and the second through-hole are disposed in the sidewalls (the first sidewall and the second sidewall) on the side of the short side of the container of the sensor unit having the rectangular shape in the plan view. Therefore, since the sensor unit is formed in a compact external shape of an elongated rectangular shape, it is possible to improve mountability on the mounting target section.

Fifth Aspect

In the sensor unit according to the fourth aspect, the fixed regions may be disposed on both sides in a long side direction of the container.

According to this aspect, the sensor unit can be fixed to the mounting target section on both sides in the long side direction and can be firmly and surely fixed.

Sixth Aspect

In the sensor unit according to the fifth aspect, in the lid, a first region of a first corner portion on the first through-hole side may be attached to the base on the side of the first sidewall of the container in the plan view and a second region of a second corner portion on the second through-hole side may be attached to the base on the side of the second sidewall of the container in the plan view.

According to this aspect, the lid and the base are attached in the first region of the first corner portion and the second region of the second corner portion on the first through-hole side and the second through-hole side. Therefore, the sensor unit including the two connectors can be configured compact without affecting the disposition of the first connector and the second connector.

Seventh Aspect

In the sensor unit according to the sixth aspect, in the lid, a fifth region closer to the side of the second region than a side of a third region of a third corner portion on an opposite side of the first corner portion of the first sidewall of the container in the plan view and a sixth region closer to the side of the first region than a side of a fourth region of a fourth corner portion on an opposite side of the second corner portion of the second sidewall of the container in the plan view may be attached to the base.

According to this aspect, on the side of the long side of the lid to which the first connector and the second connector are closer, the lid and the base are attached in the fifth region closer to the side of the second region than the side of the third region of the third corner portion and the sixth region closer to the side of the first region than the side of the fourth region of the fourth corner portion. Therefore, it is possible to eliminate interference in attachment of the first connector and the second connector. The sensor unit including the two connectors can be configured compact.

Eighth Aspect

In the sensor unit according to the seventh aspect, the base may include: a first protrusion provided in the fifth region; and a second protrusion provided in the sixth region.

According to this aspect, the lid and the base are attached in places of the first protrusion and the second protrusion. Therefore, it is possible to more surely attach the lid and the base.

Ninth Aspect

In the sensor unit according to the second or eighth aspect, the base and the lid may be attached by a screw or a joining member.

According to this aspect, the base and the lid can be easily attached by the screw or the joining member.

Tenth Aspect

In the sensor unit according to the second or eighth aspect, the lid and the base may be attached via a circumferential seal member.

According to this aspect, it is possible to improve airtightness in the attachment of the lid and the base. It is possible to reduce deterioration in detection accuracy and degradation of components due to intrusion of damp and moisture into the inside.

Eleventh Aspect

In the sensor unit according to the second or eighth aspect, a recessed section may be provided on a first surface on a side of the base to which the lid is attached, and the inertial sensor may be attached along at least any one of sidewalls on an inner side of the recessed section.

According to this aspect, it is possible to attach the inertial sensor using, as a guide of an attachment position, at least any one of the sidewalls on the inner side of the recessed section provided on the first surface on the side of the base to which the lid is attached. Consequently, it is possible to reduce fluctuation in an attachment position of the inertial sensor.

Twelfth Aspect

In the sensor unit according to the second aspect, the first connector may be attached to the first sidewall via a first seal ring, and the second connector may be attached to the second sidewall via a second seal ring.

According to this aspect, it is possible to improve, with the first seal ring and the second seal ring, airtightness in the attachment of the first connector and the first sidewall and the attachment of the second connector and the second sidewall. It is possible to reduce deterioration in detection accuracy and degradation of components due to intrusion of damp and moisture into the inside.

Thirteenth Aspect

In the sensor unit according to the second aspect, in each of the fixed regions, a hole section for positioning may be provided in a position not overlapping the first through-hole or the second through-hole in the plan view, and the hole section may be a recessed section provided on a side of a second surface in a front-back relation with a first surface on a side of the base to which the lid is attached or a through-hole piercing through the base from the first surface to the second surface.

According to this aspect, the sensor unit can be attached to a structure with high position accuracy by the hole section for base positioning.

Fourteenth Aspect

In the sensor unit according to the first aspect, the lid may have a recessed shape, and the base may be attached to the lid to close an opening of a recess of the lid.

According to this aspect, since the lid has the recess, it is possible to easily configure a housing section by attaching the lid to the base to close the opening of the recess.

Fifteenth Aspect

In the sensor unit according to the first aspect, the base may include a recessed section, and the lid may be attached to the base to close an opening of the recessed section.

According to this aspect, since the base includes the recessed section, it is possible to easily configure a housing section by attaching the lid to close the opening of the recessed section.

Sixteenth Aspect

A construction machine according to a sixteenth aspect includes: the sensor unit according to the first aspect; a work mechanism configured by a turnable plurality of members to which the sensor unit is attached; an operation device for operating the members configuring the work mechanism; and a vehicle body in which the work mechanism is provided. The sensor unit detects at least one of angular velocity and acceleration acting on the members and calculates, based on at least one of the detected angular velocity and the detected acceleration, posture angles of the members.

According to this aspect, since the compact sensor unit including the two connectors is attached, the construction machine can be provided in which, even in an extremely limited region, it is possible to connect a plurality of sensor units in series (multi-connect the plurality of sensor units) and dispose the sensor units compactly for each of setting places of the sensor units and it is possible to make it compact to draw around a cable that connects, in series, the sensor units set in the respective places.

Seventeenth Aspect

A structure monitoring device according to a seventeenth aspect includes: the sensor unit according to the first aspect; a receiving section configured to receive a detection signal from the sensor unit attached to a structure; and a calculating section configured to calculate, based on a signal output from the receiving section, an inclination angle of the structure.

According to this aspect, since the compact sensor unit including the two connectors is mounted, it is possible to provide the structure monitoring device that can be multi-connected or connected in series.

What is claimed is:
1. A sensor unit comprising:
a container including a base and a lid attached to the base to configure a housing space between the lid and the base;
an inertial sensor housed in the housing space; and
a first connector and a second connector attached to the container, wherein
the container includes:
 a first sidewall;
 a second sidewall opposed to the first sidewall;
 a third sidewall connected to one end of the first sidewall and one end of the second sidewall; and
 a fourth sidewall connected to the other end of the first sidewall and the other end of the second sidewall and opposed to the third sidewall,
the base has a first fixed region and a second fixed region that are opposite to each other along a first direction in a plan view, and the lid is located between the first fixed region and the second fixed region in the plan view,
a first through-hole is provided in the first fixed region, and a second through-hole is provided in the second fixed region,
the first fixed region, the first sidewall, the second sidewall, and the second fixed region are arranged from one side to the other side along the first direction in the plan view, the first connector does not overlap the first through-hole in the plan view, and the second connector does not overlap the second through-hole in the plan view, the first connector and the second through-hole are aligned opposite to each other across the housing space along the first direction, the second connector and the first through-hole are aligned opposite to each other across the housing space along the first direction, the base has first and second surface outwardly opposite to each other, the lid is attached to the first surface of the base, the first fixed region and the second fixed region have a first hole section and a second hole section for positioning that are provided at positions not overlapping the first through-hole and the second through-hole, respectively, in the plan view, and each of the first and second hole sections is a recessed section provided in the second surface of the base or a through-hole piercing through the base from the first surface to the second surface.

2. The sensor unit according to claim 1, wherein the first connector and the second through-hole are located on a first line segment along the first direction, and the second connector and the first through-hole are located on a second line segment along the first direction.

3. The sensor unit according to claim 1, wherein the first connector is attached to the first sidewall, and the second connector is attached to the second sidewall, and the first fixed region is located adjacent to the first sidewall, and the second fixed region is located adjacent to the second sidewall.

4. The sensor unit according to claim 1, wherein the container is in a rectangular shape in the plan view, and a first length of each of the first sidewall and the second sidewall is shorter than a second length of each of the third sidewall and the fourth sidewall.

5. The sensor unit according to claim 4, wherein the first and second fixed regions are disposed on both sides of the housing space.

6. The sensor unit according to claim 5, wherein the lid is attached to the base via a first region and a second region, and the first region is located at a first corner connected between the first sidewall and the fourth sidewall, and the second region is located at a second corner connected between the second sidewall and the third sidewall.

7. The sensor unit according to claim 6, wherein the lid is attached to the base via a third region and a fourth region, the container has a third corner connected between the first sidewall and the third sidewall and a fourth corner connected between the second sidewall and the fourth sidewall, the third region is located at the third sidewall between the second corner and the third corner, and the fourth region is located at the fourth sidewall between the first corner and the fourth corner.

8. The sensor unit according to claim 7, wherein the base includes a first protrusion provided in the third region and a second protrusion provided in the fourth region.

9. The sensor unit according to claim 1, wherein the base and the lid are attached by a screw or a joining member.

10. The sensor unit according to claim 1, wherein the lid and the base are attached via a circumferential seal member.

11. The sensor unit according to claim 1, wherein a recessed section is provided in a first surface of the base to which the lid is attached, and the inertial sensor is attached along at least any one of inner sidewalls of the recessed section.

12. The sensor unit according to claim 1, wherein the first connector is attached to the first sidewall via a first seal ring, and the second connector is attached to the second sidewall via a second seal ring.

13. The sensor unit according to claim 1, wherein the lid is in a recessed shape having a recess, and the base is attached to the lid to cover an opening of the recess of the lid.

14. The sensor unit according to claim 1, wherein the base includes a recessed section, and the lid is attached to the base to close an opening of the recessed section.

* * * * *